United States Patent [19]

Greeb

[11] Patent Number: 6,095,793
[45] Date of Patent: Aug. 1, 2000

[54] DYNAMIC CONTROL SYSTEM AND METHOD FOR CATALYTIC COMBUSTION PROCESS AND GAS TURBINE ENGINE UTILIZING SAME

[75] Inventor: Kevin Greeb, Ft. Collins, Colo.

[73] Assignee: Woodward Governor Company, Loveland, Colo.

[21] Appl. No.: 09/157,147

[22] Filed: Sep. 18, 1998

[51] Int. Cl.[7] .............................. F23N 1/00; F23L 15/00; F02C 1/00
[52] U.S. Cl. .................................. 431/12; 431/11; 431/7; 431/170; 431/75; 431/90; 431/236; 60/723; 60/39.75; 60/39.822
[58] Field of Search .................................. 431/12, 7, 11, 431/37, 170, 328, 75, 89, 90, 77, 207, 236, 237, 36, 38; 60/723, 726, 39.822, 39.75, 39.23; 422/211, 168

[56] References Cited

U.S. PATENT DOCUMENTS

| | | | |
|---|---|---|---|
| 2,743,529 | 5/1956 | Hayes | 126/299 R |
| 2,795,054 | 6/1957 | Bowen, III | 126/299 R |
| 3,662,737 | 5/1972 | Richards | 431/77 |
| 3,768,955 | 10/1973 | McLaughlin | 431/12 |
| 3,928,961 | 12/1975 | Pfefferle | 431/7 |
| 3,975,900 | 8/1976 | Pfefferle | 60/39.822 |
| 4,032,285 | 6/1977 | Rohr et al. | 431/12 |
| 4,147,502 | 4/1979 | Milton, Jr. | 422/168 |
| 4,255,927 | 3/1981 | Johnson et al. | 60/39.23 |
| 4,406,611 | 9/1983 | Michel | 431/12 |
| 5,183,401 | 2/1993 | Dalla Betta et al. | 431/7 |
| 5,232,357 | 8/1993 | Dalla Betta et al. | 431/7 |
| 5,248,251 | 9/1993 | Dalla Betta et al. | 431/7 |
| 5,250,489 | 10/1993 | Dalla Betta et al. | 502/262 |
| 5,258,349 | 11/1993 | Dalla Betta et al. | 502/330 |
| 5,259,754 | 11/1993 | Dalla Betta et al. | 431/7 |
| 5,281,128 | 1/1994 | Dalla Betta et al. | 431/7 |
| 5,326,253 | 7/1994 | Dalla Betta et al. | 431/7 |
| 5,405,260 | 4/1995 | Dalla Betta et al. | 431/7 |
| 5,425,632 | 6/1995 | Kazunori et al. | 431/7 |
| 5,461,864 | 10/1995 | Betta et al. | 60/723 |
| 5,511,972 | 4/1996 | Dalla Betta et al. | 431/170 |
| 5,512,250 | 4/1996 | Betta et al. | 422/173 |
| 5,518,697 | 5/1996 | Dalla Betta et al. | 422/173 |

*Primary Examiner*—Ira S. Lazarus
*Assistant Examiner*—Josiah C. Cocks
*Attorney, Agent, or Firm*—Leydig, Voit & Mayer, Ltd.

[57] ABSTRACT

A unique and useful dynamic control system has been invented for the control of a catalytic combustion system for use on a dynamic plant, preferably, a gas turbine engine. The dynamic control system facilitates the replacement of conventional flame combustion systems with catalytic combustion systems, which produce far less pollutants, by producing acceptable transient performance of the combustion system. A method of controlling the catalytic combustion process comprises the steps of calculating a mass flow of air introduced into the combustor, monitoring a flow of fuel to be combusted within the combustor, monitoring a temperature of the air introduced into the combustor, calculating an inlet temperature set point based on the mass flow and fuel flow, and controlling a pre-burner to heat the air based on the inlet temperature set point, the mass flow, and the temperature of the air. Further, the mass flow may be estimated based on ambient air temperature and pressure, and compressor speed. A catalytic combustion gas turbine system is also presented, the operation of which is controlled by a dynamic plant controller which generates a fuel flow rate demand signal to control the flow of fuel to be combusted in response to dynamic plant demands.

44 Claims, 15 Drawing Sheets

DYNAMIC CONTROL SYSTEM AND METHOD FOR CATALYTIC COMBUSTION PROCESS AND GAS TURBINE ENGINE UTILIZING SAME

FIELD OF THE INVENTION

The instant invention relates to combustion control systems, and more particularly to dynamic, real time combustion control systems and methods for use with catalytic combustion processes, particularly as they relate to and are utilized by gas turbine engines.

BACKGROUND OF THE INVENTION

Conventional flame combustion of solid, liquid, and gaseous fuels has been utilized for hundreds of years to provide heat for use directly, or indirectly to provide energy to drive other processes. Applications which have utilized this conventional flame combustion technology include furnaces, boilers, gas turbine engines, etc.

As concern for the environment have increased, and as the scientific understanding of combustion processes has improved, it is now an indisputable fact that emissions from conventional flame combustion of hydrocarbon fuels, is a major source of airborne pollutants. The current rate of production of these various combustion related airborne pollutants is creating an adverse impact on the environment, which quite potentially endangers the existence and well being of many plant and animal species on earth, including the human race. The recognition of this problem, has led to increased exploration in combustion technologies which can reduce the amount of airborne pollutants, and has resulted in increased governmental regulations on the various pollutants in an effort to minimize or eliminate their impact on the environment.

Certain pollutants such as sulfur-dioxide ($SO_2$), are fuel based pollutants. The removal of these fuel-based pollutants may be accomplished through a treatment process applied directly to the fuel itself, or by post-combustion exhaust treatment to remove the pollutant directly therefrom in its post-combustion state.

Other pollutants, such as carbon monoxide (CO) and unburned hydrocarbons (ULIC's), are generated as a result of the incomplete oxidation of the fuel used in the conventional combustion process. Contaminants such as this may be removed through post-combustion oxidation, or by improving the combustion process itself, to more completely combust the fuel. One way to improve the complete combustion of the fuel is to increase the temperature of the air and/or fuel components. Elevation of the combustion temperatures ensures that the temperature achieved during combustion are high enough to promote completion of the combustion reaction. However, as the amount of carbon monoxide is reduced by these elevated temperatures, emissions of $NO_x$ increase exponentially (see FIG. 1). $NO_x$ is a compound of Nitrogen and Oxygen, which contains both NO as well as minor amounts of $NO_2$. $NO_x$ is a pollutant generated in a complex reaction which occurs when atmospheric nitrogen and oxygen chemically recombine at elevated temperatures. The amount of $NO_x$ produced increases as temperature and pressure increase. Thus $NO_x$ is a by-product pollutant which is generated as a result of combustion processes, particularly internal combustion used in reciprocating and combustion gas turbine machinery.

As with other pollutants, removal of $NO_x$ may be accomplished through control of the combustion process or by removal of this pollutant from the exhaust. One way to remove $NO_x$ from the exhaust gas, (as applied in automotive applications) is to chemically react the $NO_x$ with CO to produce nitrogen and carbon dioxide ($N_2$ and $CO_2$). However, in some high temperature combustion applications, such as in a gas turbine engine, the amount of available CO is insufficient to remove the large amounts of NO, produced via the high combustion temperatures.

A conventional flame combustion process, such as that used in a gas turbine engine (see FIG. 2), operates on a cycle whereby intake air is pressurized by a rotating compressor 10. This pressurized air is passed through a chamber or "combustor" 12 wherein fuel is mixed with the air and burned. The high temperature combustion gases are allowed to expand across a rotating turbine 14 which results in a torque imparted to the turbine shaft 16. Typically, the turbine and compressor are connected to a common shaft, such that the torque created by the turbine serves to drive the compressor, thus completing the cycle. In addition, since the torque produced by the turbine greatly exceeds the "parasitic load" of the compressor, the same shaft may be coupled to an external load. It is this external shaft work which makes the gas turbine useful as a source of mechanical energy. Gas turbines are a common engine design used to power turbo-prop aircraft, electrical generators, pumps, compressors, and other devices requiring rotational shaft power.

In a typical gas turbine engine, the combustion chamber, fuel delivery system, and control system are designed to ensure that the correct proportions of fuel and air are injected and mixed within one or more "combustors." A combustor is typically a metal container, or compartment, where the fuel and air are mixed and burned. Within each combustor, there is typically a set of localized zones where the peak combustion temperatures are achieved. These peak temperatures commonly reach temperatures in the range of 3300 degrees Fahrenheit. These high temperatures also become the source of $NO_x$ emissions. Typically, to prevent thermal distress or damage to these metallic combustion chambers, a significant amount of the compressor air passes around the outside of the combustors to cool the combustors. The air which then drives the turbine is a combined mix of the hot combustion gasses and this cooling air. The resulting, hot gas yield which is admitted to the inlet of the turbine is delivered at a temperature in the range of 2400 degrees F at full load for a typical industrial gas turbine. Unfortunately, virtually all of the $NO_x$ produced in the peak temperature zones within the combustor is exhausted into the atmosphere.

In an effort to reduce the amount of pollutants generated and released by the combustion of fuel, significant effort has been expended to develop a flameless combustion process useable in furnaces, boilers, gas turbines, etc. One such flameless combustion process, developed by Catalytica Combustion Systems Inc. of Mountain View California, uses a catalyst module design which employs a honeycomb-like construction. Unique chemicals, imparted onto the interior surfaces of the honeycomb structure, serve to augment the chemical reaction of the fuel and air. This "distributed combustion" allows complete combustion of the constituents to occur at relatively low temperatures, and with comparatively low concentrations of fuel. Due to it's construction, the heat produced by the catalytic module occurs over a large zone and occurs very uniformly, eliminating the "hot zones" typical in traditional gas turbine combustors. As noted earlier, these "hot zones" are where $NO_x$ emissions originate within traditional combustion systems.

Catalytica Combustion Systems Inc. of Mountain View California has developed and patented pioneering work in the field of catalytic combustion as evidenced by the following U.S. Pat. Nos. 5,511,972; 5,518,697; 5,512,250; 5,425,632; 5,461,864; 5,405,260; 5,326,253; 5,281,128; 5,259,754; 5,258,349; 5,248,489; 5,248,251; 5,232,357; and 5,183,401. These patents describe and claim various constructions and methods to control the catalytic combustion process. These patents also describe and claim increases in combustion efficiency and reductions in the amount of undesired combustion byproducts or "pollutants" resulting therefrom. The descriptions and teachings of the catalytic combustion processes and structures of these references are hereby incorporated by reference.

While the aforementioned patents describe pioneering work in the development of a working catalytic combustor, their direct application to a dynamic system is somewhat more limited. Specifically, each of the aforementioned patents describe a control process in the context of steady state operation, at various fixed, steady state conditions. These step wise, steady state conditions are not representative of the continuous, dynamic nature of a combustion system when such combustion systems are applied on a gas turbine engine, furnace, boiler, or other combustion dependent process or plant. The nature of the application of combustion systems typically necessitate a means to smoothly transition throughout a range of operating conditions. Furthermore, many combustion systems require management of various time response characteristics for various performance and safety related reasons. Within the context of the larger, more complex, combustion dependent process, the catalytic combustion system requires an appropriately designed, dynamic control system to manage the multiple complex dependencies required to achieve proper operation of the catalytic combustion process. In addition, the control system must also monitor, and manage these combustion processes over a continuous range of static conditions, while providing appropriate dynamic performance as dictated by the larger system; i.e. the gas turbine engine, furnace, boiler, etc.

In general, a combustion system is used as a subsystem of a larger, more complex process (referred to subsequently as the "Plant") The Plant could be a gas turbine powered generating package, with its compressor, turbine, and generation sub-systems, a paper manufacturing plant requiring a steam generator for pulp processing and drying, a material processing plant which produces refined metals, crystals, or ceramics from raw materials, or any number of other processes or applications which rely on the heat energy released by the combustion process. Each of these larger processes requires that the combustion process be regulated appropriately to satisfy the final objective of the plant or process. Generally, some form of control system has been developed to regulate these traditional (non-catalytic) combustion processes. These Plant control systems have been designed, developed, and refined to manage the specific needs of the overall processes, including the requirements to vary the combustion process over vastly varying, dynamic, real time operating conditions. In the majority of combustion applications, dynamic requirements must be maintained to ensure that the process requirements are always in control. The Plant control system generally ensures that the thermal limits, pressures, and rates of change are properly maintained within the design limits of the process. Due to the tremendous energy released by an industrial scale combustion process, failure to maintain control of these combustion process can result in situations which may result in loss of life, significant financial loss, and/or significant environmental damage. More modern Plant control systems must also monitor and regulate the amount of pollutant gasses admitted to the atmosphere. Catalytic combustion systems also require an appropriate control system, to ensure that the requirements of the overall process are maintained, but additionally, require a control system to ensure that the process conditions required for proper operation of the catalytic combustor are maintained.

One system which could benefit from the utilization of catalytic combustion is a gas turbine engine. These machines are commonly used to power large, commercial, electrical generators. In this exemplary environment, the requirements of the overall system cover a wide range of operating and dynamic requirements. Operating conditions may change almost instantaneously, as the system of mechanical components, some rotating at high speed and generating large amounts of heat, pressure, and horsepower, must suddenly transition to a no load condition, at the sudden opening of an electrical circuit breaker. In this example, the control system must be able to reduce the output of the combustion process in a fraction of a second to ensure that the machine does not overspeed beyond it's design limits. In addition, operation of the combustion system must be regulated to ensure that the combustion components are maintained within safe limits. It is the function of the control system(s) to continuously regulate the overall Plant as well as the combustion subsystems.

SUMMARY OF THE INVENTION

It is therefore an object of the instant invention to overcome the above-described and other problems existing with the current state of the art in catalytic combustion controls. More particularly, it is an object of the instant invention to provide a dynamic control system capable of controlling a catalytic combustion process appropriate for use in real world, dynamic systems. It is a further objective of the instant invention to provide a dynamic control system for a catalytic combustion process which maintains output pollutant production at or below maximum acceptable limits, over the entire operating range of the system with which it is operated. Additionally, it is an objective of the instant invention to provide a dynamic control system for a catalytic combustion process for a gas turbine engine. Furthermore, it is an object of the instant invention to provide a dynamic control for a catalytic combustion process for application on a gas turbine engine, which interfaces appropriately with the balance of the process control functions, to ensure that the requirements of the turbine are maintained simultaneously to the proper operation of the catalytic combustion process.

In view of these objectives, it is a feature of the instant invention that the dynamic control system for the catalytic combustion process may control single or multiple stage catalytic combustion systems. It is a further feature of the instant invention that the dynamic control system is programmed with appropriate process conditions, schedules, etc. to provide critical setpoint and limit levels for subsequent operation. It is a further feature of the instant invention that the dynamic control system will process a series of algorithms and logic structures designed to regulate the catalytic combustion in a safe and optimized manner over the entire range of output required by the Plant and the Catalytic Combustion System. It is an additional feature of the instant invention that the dynamic control system monitor and regulate the operation of one or more required pre-burner systems to maintain the catalyst inlet temperature at levels appropriate to the requirements of the Catalytic Combustion process and the Plant, over the complete range of operation required by the Plant. Additionally, it is a feature of the dynamic control system of the instant invention to maintain proper pre-burner temperatures resulting in minimal emission of pollutant gasses. Additionally, it is a feature of the dynamic control system of the instant invention to continuously monitor and regulate the combustion process to ensure that the catalyst module is protected from damage due to over temperature. It is a further feature of the instant invention that the dynamic control of the catalytic combustion process may be accomplished with continuous, on-line calculation of the air mass flow rate which passes through the catalytic combustor and/or preburner system(s). It is an additional feature of the dynamic control system of the instant invention that various control functions can be applied based on the calculated values of the air mass flow which passes through the catalytic combustion module. Furthermore, it is a feature of the instant invention that the dynamic control system for the catalytic combustion process is capable of anticipatory control functions which minimize transition times during transient operation of the combustion system or the Plant. Additionally, it is a feature of the instant invention that the dynamic control system for the catalytic combustion process is capable of detecting the failure of sensors, without which optimum operation of the catalytic combustion system and/or the Plant may be compromised. It is an additional feature of the instant invention that the dynamic control system for the catalytic combustion process is capable of monitoring and diagnosing the condition of the air source, in order that control of the catalytic combustion system may be maintained within safe operating conditions, and in order that exhaust emissions be maintained within acceptable limits. It is a feature of the instant invention that the Dynamic Control System can be adapted, in a straight-forward manner, for use on systems with differing control trajectories and operational limits, once these limits have been defined.

In view of these objects and features, it is an aspect of a preferred embodiment of the instant invention, as applied on gas turbine engines with at least one pre-burner and at least one catalyst module, to incorporate Plant and catalytic combustion monitor and sequencing functions. Preferably, these functions compare the critical instrument readings to the set of pre-determined setpoints to verify that the system is operating within the range of "acceptable" limits. The control system of the instant invention compares the individual parameter readings to each limit. In the event that any parameter reading indicates that a portion of the Plant or combustion system are at or outside of the range of allowable limits, the control system of the instant invention initiates appropriate corrective action(s) through various signal outputs. These outputs may control output devices directly (i.e. fuel control devices), and override the output signals being produced or generated by other sections of the control logic, with the purpose of restoring the system to within the operating limits. These functions are subsequently referred to as "Limiter" and/or "Trip" functions.

Further, it is an aspect of the instant invention to compute the required change in combustor output temperature to satisfy the speed, and/or temperature, and/or pressure, and/or acceleration, and/or deceleration, regulators required by the Plant, in accordance with the trajectory requirements for these parameters (these functions are subsequently referred to as "turbine governor functions"). These functions require setpoint information and trajectories for speed, exhaust gas temperature, combustor pressure, acceleration or deceleration rate, as examples, as well as the current process values for each parameter. The function of the control logic is to calculate an appropriate correction in catalyst fuel flow rate to satisfy the turbine governor functions.

Additionally, it is an aspect of the instant invention to provide calculation of the combustion air mass flow rate. In one embodiment of the instant invention, a method for determining combustor air flow rate utilizes the sampled values of absolute pre-burner inlet pressure, absolute preburner inlet temperature, and preburner differential pressure in conjunction with the specific known thermodynamic properties of air, in conjunction with the aperture area through which the air must pass. An equation using these parameters is processed by the control system, at a rate appropriate to the dynamic requirements of the Plant, to generate a continuously updated values for combustor airflow rate. An alternate embodiment of a method to determine combustor air flow utilizes the sampled values of the absolute temperature as measured immediately upstream of the preburner, the measured value of absolute temperature downstream of the preburner, and the fuel mass flow rate being provided to the preburner(s). Using the measured temperature rise across the preburner, combined with the amount of fuel required to generate the temperature rise, the mass flow rate of air passing through the preburner can thus be calculated.

A further alternate embodiment of a method to determine combustor air flow utilizes data based on the performance characteristics of the air source and the Plant. Such a "Model Based" estimate, uses known characteristics of the compressor or blower, in conjunction with other sub-systems which effect the air flow rate directed through the combustion section. Utilization of on-engine measurements of compressor intake and discharge pressures, and temperatures, compressor speed and appropriate calculations of bias effects due to ambient temperature, air losses to engine cooling paths, and the position or readings from compressor peripheral systems can be used to generate a calculation of the airflow passing through a gas turbine combustion system. Additionally, an alternate embodiment of the instant invention, for use in a dynamic plant such as a steam boiler system, relies on a magnitude of air flow rate to be provided as an instrument reading. In some systems where the instant invention is anticipated to be used, an independent instrument or set of instruments may be used to determine air flow rate through the combustion system. If such a device or system is in use, or could be used in conjunction with the catalytic combustion system, its reading of air mass flow rate can be easily incorporated into the system, provided that the transient behavior of such instrument readings meet the requirements of the Plant.

A further aspect of the instant invention is to provide management of the catalytic combustion system ignition, fuel staging, and catalyst warm-up sequences. The dynamic control system of the instant invention manages various sequences important to proper operation of the catalytic combustion system. These basic sequences include the initiation, duration, and termination of one or more ignition system(s) to ensure that the preburner systems have been successfully lit. Preferably, a separate set of functions regulates the starter speed. The control system of the instant invention also monitors the set of parameters necessary to determine operational readiness as well as basic inputs from a separate plant control or human operator, and directs relay outputs which control the starter and ignitors. The starter, ignitor, and preburner functions are operated essentially in unison to initiate the combustion process. In addition, the control system of the instant invention manages the fuel delivery by controlling the fuel metering and/or fuel shutoff valves. The staging functions of the instant invention ensure that gas is being delivered to the appropriate preburner or catalyst fuel path, at the appropriate time, and at the appropriate flow rate, to ensure proper operation of the combustion system and the Plant. The Control System can shut off one or more flow paths to ensure that proper operation and safety conditions are continuously maintained. The dynamic control system of the instant invention also coordinates the operation of the preburners to achieve proper warm-up of the catalyst module. This warm-up sequence ensures that the required activation energy is imparted to the catalyst module, such that the catalytic combustion system will respond appropriately during subsequent transient operation.

A further aspect of the instant invention includes the determination of catalyst module air/fuel ratio and preburner management, or preburner temperature setpoint control. This combination of functions uses the results of the combustor air flow calculations and the fuel flow rate being delivered to the catalyst module to compute the instantaneous catalyst air/fuel ratio and the temperature output of the catalyst module. Based on the catalyst air fuel ratio and the catalyst exit temperature, a comparison is made between the current catalyst inlet conditions and those required for optimum operation of the catalyst module. If the dynamic control system of the instant invention determines that the air fuel ratio, or exit temperature of the catalyst module (dictated by the requirements of the turbine governing functions) in combination with the current catalyst inlet temperature, resulting in conditions tending toward increased CO and/or UHC emissions, the preburner management functions will increase the preburner temperature setpoint, forcing an increase in preburner exit temperature. This increase in preburner discharge temperature improves the combustion efficiency of the catalyst module which will reduce the CO and UHC emissions of the combustion system.

Conversely, if calculations made by the dynamic control system of the instant invention dictate that the catalyst air/fuel ratio and catalyst inlet temperature are tending toward excessive temperature of the catalyst module, the preburner management functions will reduce the preburner setpoint and/or reduce or limit the catalyst output temperature. A reduction in catalyst inlet temperature, or reduction in the catalyst fuel flow rate will reduce the internal temperatures within the catalyst module thus increasing catalyst module service life. As power level and ambient conditions change, the preburner management functions continuously optimize the preburner exit temperature to the optimum level, thus reducing pollution emissions, while maximizing catalyst module life.

A further aspect of the instant invention includes the control of preburner exit temperature. This aspect of the dynamic control system of the instant invention utilizes the sampled value of compressor air discharge temperature and the sampled preburner discharge temperature setpoint to compute the amount of additional temperature rise required from the preburner(s). In a preferred embodiment of the invention, an algorithmic sequence utilizes the results of the air flow calculation(s) to back-calculate the required amount of preburner fuel flow, to obtain the required preburner exit temperature. Since the derived methods of air flow can generate an approximation of the appropriate fuel flow rate more quickly than most typical temperature transducers, changes in fuel flow in response to transient changes in air flow rate can be quickly corrected, before readings from the temperature transducers would typically be received. In a preferred embodiment of the instant invention, the final readings of the temperature transducers are used in conjunction with these airflow derived estimates to produce a final trimming correction to the preburner fuel flow rate, thus ensuring that the desired preburner exit temperature is precisely attained, and that rapid transient response can be achieved. The output of this preburner exit temperature management logic included within an embodiment of the instant invention is used to position or direct the output of the fuel control valve(s) which physically manipulate the preburner temperatures. Additionally, information generated within the preburner exit temperature management logic is available to the process parameter output functions for use in diagnostics, preventive maintenance monitoring, or other Plant control operations.

A further aspect of the instant invention concerns the process parameter outputs. The current values of various input, intermediate calculations, and output parameters (i.e. combustor inlet temperature, combustor discharge temperature, turbine speed, etc.) are sampled (preferably continuously) for use in the algorithms as described above. This information can be buffered and communicated electronically to a man-machine interface device, or to another data acquisition or control system. The ability to derive and transmit this data provides operationally significant information which can be used for system diagnostics, preventive maintenance monitoring, or other Plant control operations. Use of various instrument readings, and derived states can also be used in alternate embodiments of the dynamic control system having a more detailed model based control implementation of the gas turbine plant.

An additional aspect of the instant invention is the generation of system performance correlations. Preferably, the dynamic control system generates sufficient information generated via one or more of the imbedded algorithms to provide correlations with "as-new" engine performance data. These correlations may be used to diagnose or detect reductions in air flow delivery which can reduce fuel efficiency, engine performance, and result in increased pollution emissions, if not corrected. Additionally, several parameters, such as catalyst inlet temperature and turbine inlet temperature can be derived using algorithms and alternate instrument readings. This yields an opportunity to apply logic within the Plant control system to use these "pseudo instrument readings" in the event of transducer failure, or potentially to reduce the cost of the catalytic combustion system. Further, it is an additional aspect of the instant invention to manage multiple pre-burners. The system of the instant invention preferably includes multiple combustion zones to generate the required temperature rise at the catalyst inlet. These combustion zones may be designed to be controlled independently, with each contributing a fraction of the total temperature rise, and each path being controlled to achieve optimum conditions of output temperature and pollutant emissions. Alternatively, the dynamic control system permits multiple preburner paths to be controlled dependently, where one or more paths are optimized. In this embodiment, the remaining path(s) are controlled to bring the total temperature rise to a level precisely matching the preburner temperature setpoint.

These and other aims, objectives, and features of the invention will become more apparent from the following detailed description when taken in conjunction with the accompanying drawings.

Figure 1:
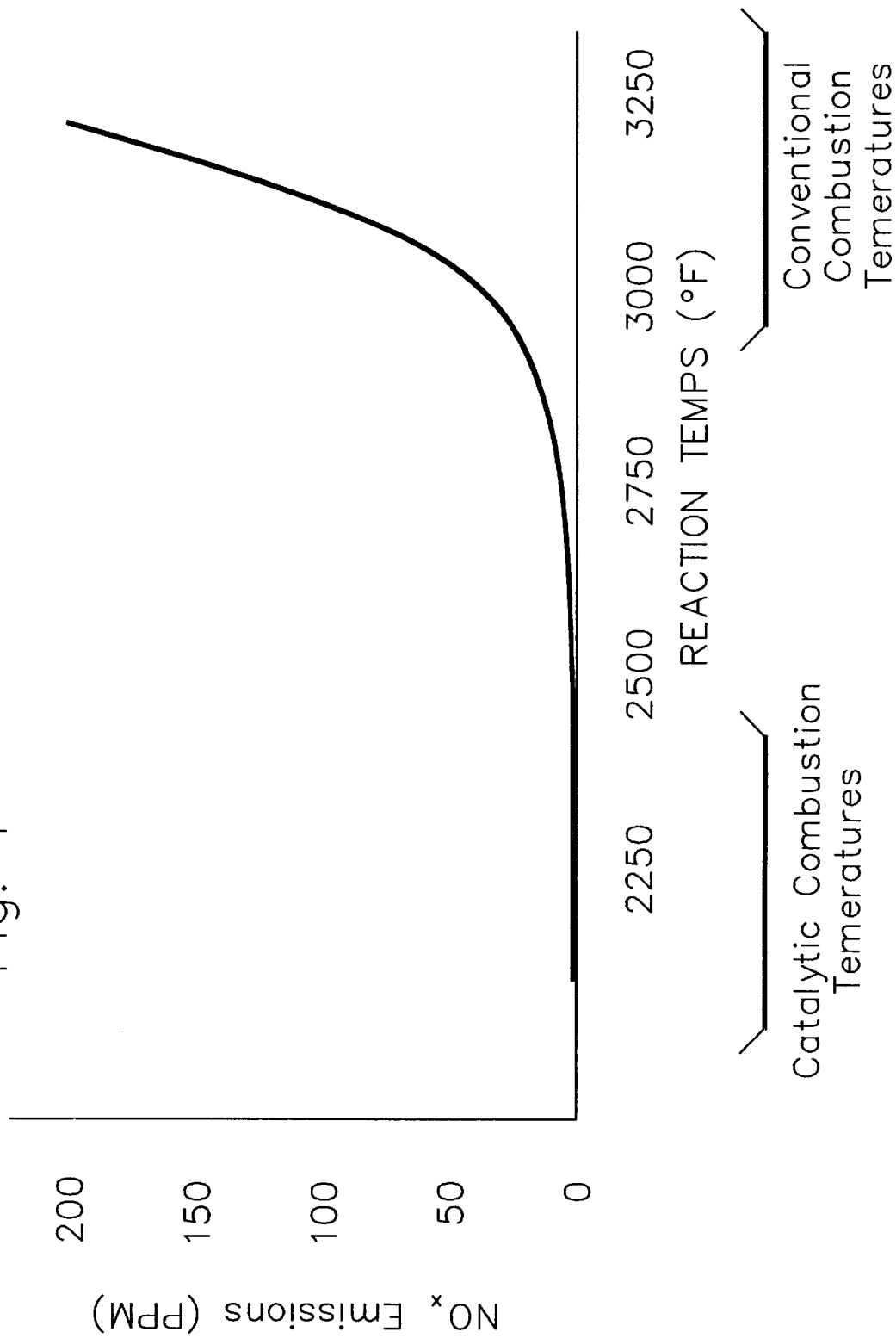
FIG. 1 is a graphical illustration of $NO_x$ production versus reaction temperature as generated in a combustion process.
Figure 2:
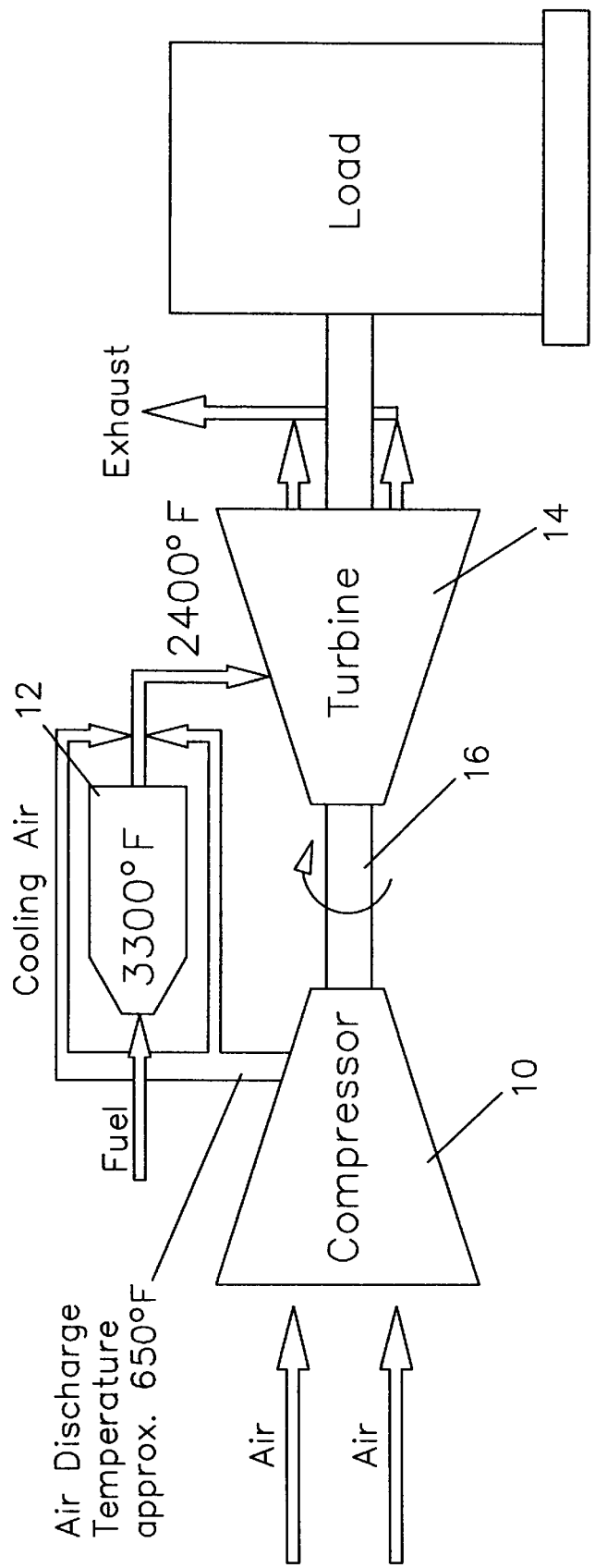
FIG. 2 is a schematic illustration of a prior art gas turbine system utilizing a conventional flame combustor.

While the invention is susceptible of various modifications and alternative constructions, certain illustrative embodiments thereof have been shown in the drawings and will be described below in detail. It should be understood, however, that there is no intention to limit the invention to the specific forms disclosed, but on the contrary, the intention is to cover all modifications, alternative constructions and equivalents falling within the spirit and scope of the invention as defined by the appended claims.

DETAILED DESCRIPTION OF THE PREFERRED EMBODIMENT

While the dynamic control of the instant invention will be described hereinbelow in relation to its interface and operation with a gas turbine engine, one of ordinary skill in the art will recognize that the control structures and methods described herein can be utilized for dynamic control of catalytic combustion systems for various types of plants including, for example, furnaces, boilers, etc. Therefore, the interfaces and functions as applied to a gas turbine engine are to be taken as exemplary only and not as limitations on the scope of the invention as defined by the claims appended hereto.

One skilled in the art will also recognize that the invention is preferably implemented in a suitable, electronic computing system with data acquisition capabilities. The basic requirements of this electronic system (hereinafter the "electronics platform") may vary substantially and should not be considered to limit the scope of the invention. The following requirements of the electronics platform are included only to aid in the understanding of the design and implementation of the dynamic control system of the instant invention for catalytic combustion. In a typical electronics platform suitable for use with the instant invention, acquisition of the required process variables are accomplished at a rate appropriate to the dynamic requirements of the Plant and the catalytic combustion process. The invention optimally operates in a system which can obtain readings from various instruments which monitor various process conditions within the Plant, and within the catalytic combustion system. In addition, the platform is preferably capable of buffering the results of various derived parameters based on these instrument readings for use in subsequent calculations. This operational data is used as the computation of the control logic.

Additionally, the electronics platform also has the capability to compute the required mathematical functions in a timely manner. The system must be capable of processing the required calculations and passing the results to subsequent equations or routines at an update rate sufficient to the management of the catalytic combustion processes, as well as that required to control the plant. The platform also has the capability to interface with appropriate output devices. The system of the instant invention directs the final values for each output variable to the appropriate output devices in order to interface with the machine. The update rate of the output signal processing system and communication methodology (i.e. voltage output, current output, serial communications, etc.) must be performed at a rate appropriate to management of the catalytic combustion processes, as well as that required to control the plant.

Additionally, the platform should provide a definition of a set of desired control parameter trajectories and operating range limits appropriate to the design requirements of the plant, and a set of desired control parameters and operating range limits specific to the version of catalytic combustion to be applied on the plant. Due to the vast number of design variations between types of plants and the potential differences in the design of an appropriate catalytic combustion system, each system will require a somewhat unique set of control trajectories and operational range limits. It is a feature of the instant invention that the dynamic control system can be adapted, in a straightforward manner, for use on systems requiring a broad range of control trajectories and operational limits, once these parameters have been established.

Figure 3:
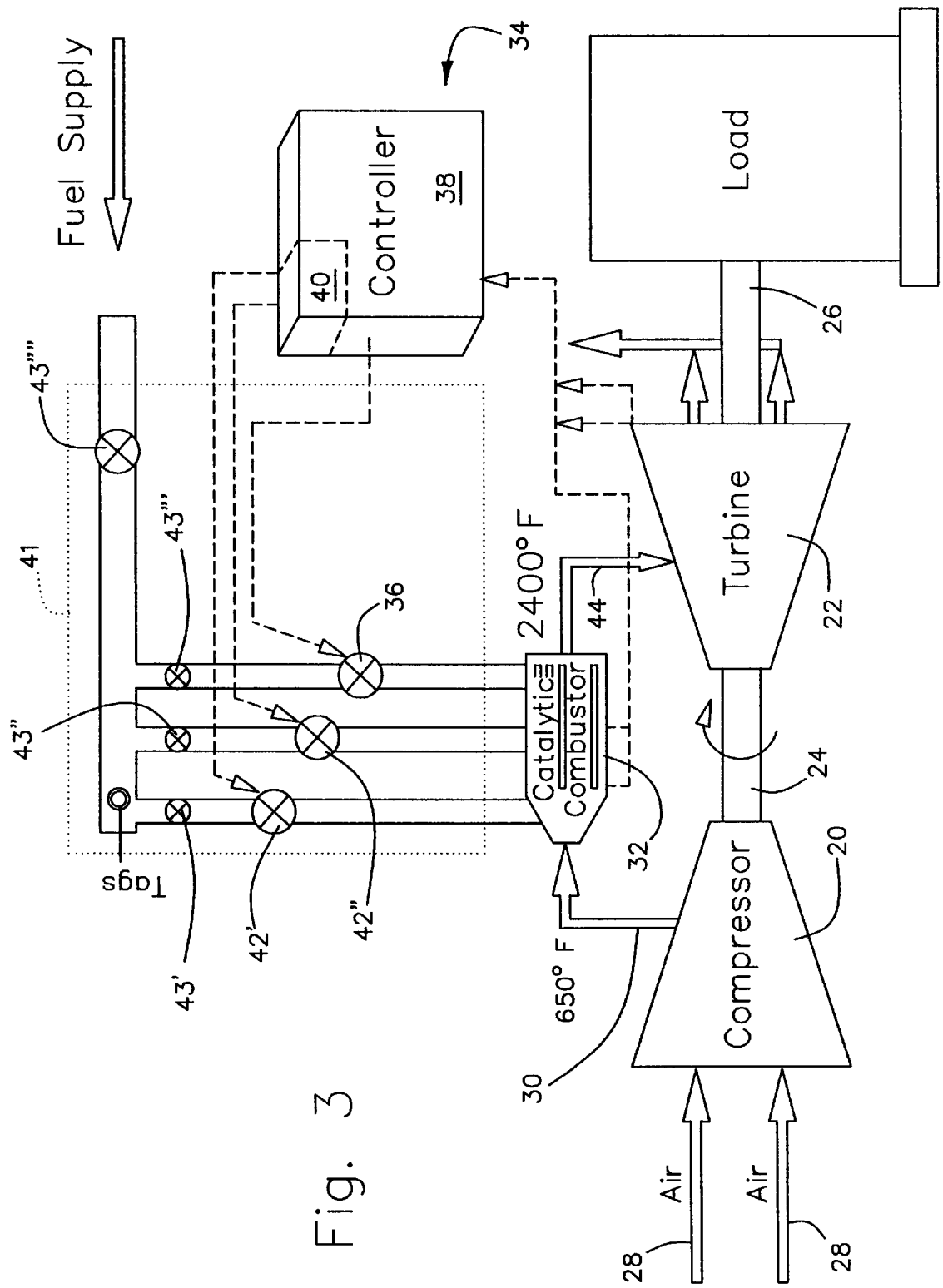
FIG. 3 is a schematic representation of a gas turbine system, illustrating the basic interconnections between the catalytic combustion system, the dynamic control system, and the fuel delivery system in accordance with the teachings of the instant invention.

With specific reference now to the drawings, FIG. 3 illustrates a dynamic system utilizing a catalytic combustion process which is particularly well suited to application of an embodiment of the control system of the instant invention. Specifically, the gas turbine system illustrated in FIG. 3 comprises a compressor 20 coupled to and driven by a gas turbine 22 by shaft 24. In addition, the gas turbine 22 also drives shaft 26 which provides rotational energy to, for example, an electric power generator (shown as "Load") to generate electric power for a plant or municipality as required. During operation air as illustrated by lines 28 enters the compressor 20 wherein it is compressed. During the compression process within the compressor 20 the temperature of the air increases to approximately 650° F. This compressed, high-temperature air, as illustrated by line 30, is mixed with the fuel to form a gaseous air-fuel mixture within the catalytic combustor 32. The amount of fuel flowing to the catalytic combustor to be mixed with the high temperature compressed air 30 is controlled by a controller 34 through metering valve 36. The control structure which regulates the main flow into the combustor 32 may take the form of a gas turbine control structure operating on control parameters of, e.g., speed, exhaust gas temperature (EGT), and acceleration/deceleration. Simplified or more complex control structures for the main fuel control to drive the gas turbine 22 may be utilized as desired. The portion of controller 34 which contains the typical gas turbine control structure is illustrated as portion 38 of controller 34.

The control of the catalytic combustion process also preferably takes place within controller 34, and more specifically within portion 40 of controller 34, although one skilled in the art will recognize that this location is not critical to the invention. This portion 40 of controller 34 controls at least one metering valve (42', 42") which meters fuel to at least one pre-burner (not shown) within the catalytic combustor 32. The control of these metering valves 42', 42" is optimized to maintain an ideal operating point for the catalytic combustion process to ensure that the output combusted gas of the catalytic combustor 32 is maintained at an approximate temperature of 2400° F. as illustrated by line 44. This heated combusted gas 44 is used to drive the turbine 22 in a conventional manner as will be recognized by one skilled in the gas turbine engine art.

More specifically, with continuing reference to FIG. 3, during operation ambient air enters the compressor 20 wherein it is compressed. Fuel is injected into the various sections of the catalytic combustion system where it is mixed with the compressed, heated air. This air-fuel mixture is burned within the various stages of the catalytic combustion system. A percentage of the fuel is burned within one or more stages of the preburner (not shown), with the objective of raising the temperature of the compressed air from that resulting from the heat of compression, to a level appropriate for optimum operation of the catalyst module (not shown). The amount of fuel burned within the preburner(s) is regulated by the dynamic control system 40 of the instant invention by modulation of one or more preburner control valves 42', 42". The balance of the fuel is burned within the catalyst module and regulated by the dynamic control system 40 by modulation of one or more catalyst fuel control valve(s) 36 to regulate the output of the plant. The dynamic control system 40 also controls isolation valves 43', 43", 43''', 43'''', 43'' which may be applied within the fuel delivery system 41. A preferred embodiment of the instant invention applies a set of control logic structures within portion 38 which manage the typical gas turbine governing functions. Examples of these governing functions include regulation of the turbine's rotational speed, limiting of the turbine exit temperatures, and control of the turbines starting sequence, as well as the acceleration and deceleration of the turbine and/or driven load. Alternative control structures required to manage the gas turbine may be simplified from the preferred embodiment of the instant invention, or made more complex, as necessary based on specific requirements of the plant.

Figure 4:
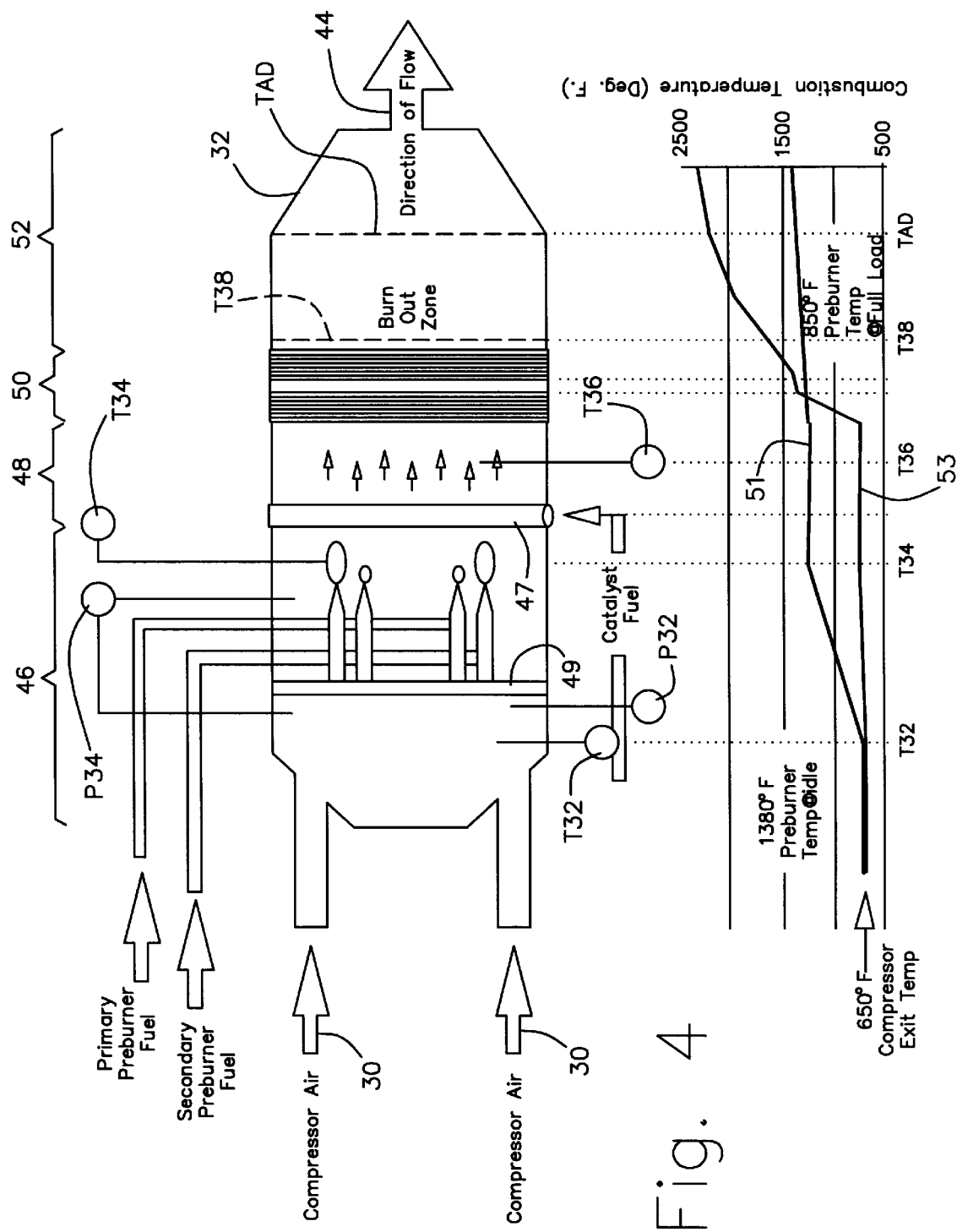
FIG. 4 is a schematic representation of the catalytic combustion system relating the physical location of various elements of a catalytic combustion system to a temperature gradient as a function of these physical combustion elements along the flow path.

Turning now to FIG. 4, a more detailed description of the catalytic combustor operation is illustrated in both schematic and graphic form as it increases the temperature of the input compressed air, begins the combustion of the gaseous air-fuel mixture, and fully combusts the mixture to produce output hot gases in the range of 2400° F. Although this diagram represents a typical, two stage catalytic combustion module 32, with a two stage preburner, the various functions can be applied to alternate variations of the catalytic combustion system, dependent upon its specific configuration. The catalytic combustor 32 comprises an input air temperature control section 46, a fuel-air mixing portion 48, at least one catalyst module 50, and a combustion burner zone 52. The temperature throughout each of these sections is illustrated below the schematic diagram with line segments 51 and 53 representing idle and full load conditioning, respectively, related to their physical section of the catalytic combustor 32 as sensed by the preburner temperature sensor T32, the preburner exit temperature sensor T34, the catalyst inlet temperature sensor T36, and derived temperatures at locations T38 and TAD as computed by the instant invention.

The catalytic combustion process begins as the dynamic control system directs a series of prestart sequences. Typically there are a set of pre-ignition sequences and system checks managed by the plant control system to ensure the operational readiness of the plant. As an example, the controller 34 brings the turbine to the required purge speed by modulating the output signals to the starter (not shown). The controller 34 maintains the turbine at the appropriate purge speed for the specified time to ensure that any combustible fumes are properly evacuated from the turbine and exhaust systems, preparing the system for the ignition sequence. Once this series of sequences are complete, the process of initiating combustion will begin. From this point, the dynamic control system, manages the operation of the ignitors and fuel delivery system to satisfy the requirements of the plant.

The dynamic control system controls the starting sequence of the gas turbine, or the sequence of increasing airflow to the combustor, in a boiler or furnace application, by providing a digital output which indicates a "Start OK" status within the dynamic control system. The "Start OK" status is True when no faults are detected, and the setpoints are at the appropriate values corresponding to ignition. When a start enable signal is provided from the plant control system or operator, the dynamic control system closes a relay output which is connected to the starting system. When this first relay is energized, the system will ramp to the appropriate ignition speed. When the dynamic control system detects that the ignition speed, or that the appropriate ignition airflow, has been achieved, the fuel stop valves 41 (see FIG. 3) and preburner metering valves 42 are appropriately regulated to allow the appropriate amount of fuel to be injected into the air stream within the preburners. Simultaneously, a signal is delivered to an interposing relay, which initiates the operation of the electrical ignition system (a component of the combustion system). A few seconds after the ignitors are turned on, the dynamic control system computes the temperature rise, as measured by the T34 transducers, and if the rate of change of preburner temperature meets a predetermined level, the dynamic control system will increase the fuel to be delivered to the preburner system. The dynamic control system then increases the preburner temperature setpoint, to the appropriate "warm-up" level. The output temperature of the preburner(s) are maintained at this warm-up level, until it is detected that the catalyst module has reached a sufficient temperature so that its combustion processes can be efficiently effected. At this point, the gas turbine starter is ramped to it's maximum speed, and fuel is admitted to the main gas mixing system 47 as regulated by the dynamic control system for subsequent combustion within the catalyst module 50, if additional heat output is required by the plant, to achieve the appropriate idle or minimum output requirements of the plant. The dynamic control system manages this catalyst warm-up sequence, and prevents fueling of the catalyst module 50 until the warm-up sequence has been completed.

As increased amounts of air are delivered by the compressor 20, blower, fan, etc. to the catalytic combustor 32, its flow is restricted by the preburner diaphragm 49 which forces the air flow to pass through one or more preburner(s) 54 and 56. This restriction creates an increase in the combustor inlet pressure as measured by the preburner pressure sensor P32 and an increase in the pressure differential across the diaphragm as sensed by the preburner differential pressure sensor P34 which is used by the dynamic control system to calculate the air mass flow rate being delivered through the combustion system. In a preferred embodiment of the invention, the temperature of the air being delivered to the inlet of the preburner is monitored by a set of temperature sensors T32. In addition, the temperatures achieved at the preburner discharge are monitored by sensor T34 and controlled by the dynamic control system. In a preferred configuration of the catalytic combustor, temperature sensors T36 are also located at the inlet of the catalyst and are also monitored by the dynamic control system. In a preferred embodiment of the dynamic control system the output of the preburner(s) 54, 56 is regulated by controlling the fuel flow delivery of the preburner fuel valve(s) 42', 42" (see FIG. 3), to raise the compressed air temperature to a level that required for optimum performance of the catalyst module 50.

The air, heated by the preburner(s) 54, 56, is then passed through a gas mixing structure 47 at a precisely regulated temperature. The dynamic control system regulates the precise rate of catalyst fuel in accordance with the requirements of the plant. This fuel is injected and mixed then imparted into the catalyst module 50, where catalytic combustion of the mixture begins. Heat is released by the combustion of the air-fuel mixture as the gas passes through the catalyst module 50, progressively increasing the molecular kinetic energy of the constituents. The heat of combustion imparted to the air-fuel mixture along the length of the catalyst module 50, enhances the occurrence of subsequent reactions in the downstream sections of the catalytic combustor 52. Thus, as the gas mixture passes through the length of the catalyst module 50, the temperature rises steadily along the axial length of the catalyst system. Preferably, some cells within the catalyst module 50 are specifically manufactured without the internal catalyst coating. As a result, a fraction of the air-fuel mix passes through the catalyst module 50, with essentially no combustion reaction. The combustion of this fraction of the air-fuel mixture is achieved when the hot gasses exiting the catalyst module 50 are at or above the necessary reaction temperature which varies as a function of air/fuel ratio. The highest temperature is attained downstream of the catalyst module 50 within the burn out zone chamber 52 as measured by temperature sensor TAD. These hot gases are then delivered to the inlet of the turbine 22, generating torque which rotates the driven load, and the compressor 20 via shaft 24 (see FIG. 3), thus completing the cycle.

After the catalytic combustor 32 reaches its appropriate operating temperature, the catalyst fuel flow through metering valve 36 is scheduled by the gas turbine control structure 38 to appropriately accelerate the turbine at the desired rate. After bringing the turbine to synchronous speed, the controller 34 will wait for a sequencing command before synchronizing the generator frequency with the grid frequency in an electric power generation application. Once the sequencing command is received, the controller 34 will trim the turbine speed to match the generator frequency with the grid frequency in a conventional manner. When the generator output is in phase, utility breakers are closed and the load reference increased, permitting the generator to export power to the utility grid.

To increase the power exported to the power grid, the gas turbine control structure 38 increases the fuel rate delivery to the catalyst module by varying the metering valve 36. The additional heat energy provided by the increase in fuel delivery creates an increase in torque at the power turbine. Increase in torque results in a proportional power output to the grid. As the catalyst fuel flow rate increases through metering valve 36, the catalyst inlet temperature required for adequate activation energy decreases. The catalytic combustor control section 40 monitors the catalyst fuel flow rate, turbine and generator operating conditions, and determines the optimum catalyst inlet temperature required to maintain the catalyst activation energy for optimum catalyst life and emissions as will be described more fully hereinbelow. The pre-burner fuel flow is regulated by this control 40 through metering valves 42' and 42" to ensure that this desired catalyst inlet temperature is maintained, smoothly and seamlessly as the load demand on the machine is varied. At the same time, the control 40 adjusts the output to the primary pre-burner 54 to maintain stability and proper operation of the lean premix secondary pre-burner 56. Throughout the range of operation, the controller 34 regulates the catalyst fuel, the fuel flow to both pre-burner stages 54, 56 to maintain optimum performance, and emissions even under rapidly changing load conditions such as a sudden load increase, load drop, or utility breaker trip.

An attribute of the catalytic combustion system is that the overall temperature rise is generated progressively by the various elements along the path length of the catalytic combustion system. The temperature gradient produced along the functional length of the catalytic combustor is graphically illustrated in the lower section of FIG. 4. In this figure, the temperature gradient induced by each element is represented by a increase or decrease in the magnitude of the temperature curve along the length of the combustor 32.

An additional attribute of this catalytic system is that, as long as the preburner exit temperatures are uniformly provided to the inlet plane of the catalyst, the exit temperatures will also be uniform without the presence of "Hot Zones" typical in conventional combustion systems. To ensure the uniformity of the preburner temperature, a function of the instant invention is to monitor the various exit temperature thermocouples T34, and numerically compare the difference in the individual readings. If the individual readings differ by more than a predetermined amount, as specified within the design limits, the dynamic control system will initiate an alarm indicating that the temperature uniformity is not within the allowable optimum range. The dynamic control system may also initiate a shutdown if the temperature uniformity is not within the allowable operational range. Additionally, intermediate levels can be checked and an appropriate action taken within the control logic, if desired, using the same basic logic structure, in conjunction with an appropriately specified design limit for each level. An exemplary logic structure required for these functions is illustrated below:

If ΔT(measured)>Design Limit #1 then Non-Uniformity Limit #1=True

Where ΔT(measured) is the numerical difference between the highest and lowest preburner temperature readings.

Design Limit #1 is a predetermined maximum allowance for temperature spread across the preburner.

Non-Uniformity Limit #1 is an example output variable used as a logic flag within the control to indicate that the preburner temperature uniformity is not within the acceptable limits.

This exemplary structure is used in conjunction with one or more established temperature limits. Thus, multiple separate temperature limits may be used to effect various changes in the dynamic control systems outputs. For example, if the temperature difference between the highest and lowest signals exceeds the maximum recommended limit, a "True" condition may be used to initiate a warning buzzer or visual indication. If the non-uniformity were to exceed the maximum design limit above which damage might occur to the combustor, a separate, higher limit may be used to initiate an emergency trip. This trip sequence is effected by the dynamic control system by immediate closure of the fuel valves to all paths, thus terminating the combustion process. The state of the non-uniformity condition(s) may be latched (maintained at a high state) within the dynamic control system, buffered, and communicated to an operations panel so that the condition causing the shutdown may be known.

Figure 5:
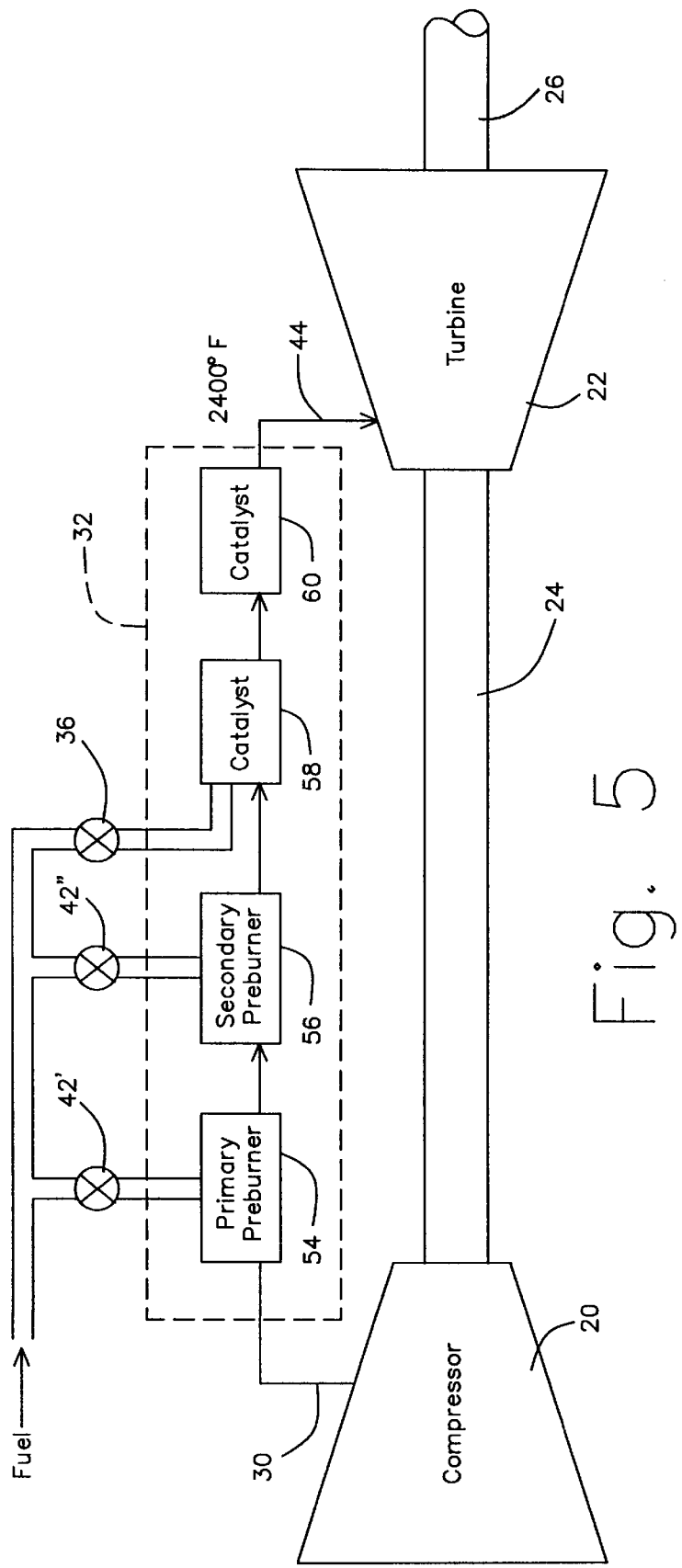
FIG. 5 is a block diagrammatic schematic illustration of a gas turbine system utilizing a catalytic combustor having a primary and a secondary pre- burner as well as multiple stages of catalytic combustion controllable by an embodiment of the instant invention.

As indicated above and illustrated in simplified block diagrammatic form in FIG. 5, the catalytic combustion section 50 of the catalytic combustor 32 may comprise multiple catalyst modules 58, 60. In such systems, the temperature rise across the catalyst modules 58, 60 due to the combustion reaction undertaken by the gaseous air-fuel mixture is limited, thereby limiting the thermal stress across the particular catalyst module. As illustrated in FIG. 5, the catalytic combustor 32 comprises two catalyst modules 58, 60. The first catalyst module initiates the catalytic combustion process and raises the temperature of the gaseous air-fuel mixture from approximately 850° F. at its inlet (at full load) to approximately 1400° F. at its outlet. The second catalyst module 60 then takes this partially combusted gaseous air-fuel mixture at approximately 1400° F., further reacts with the gaseous air-fuel mixture to continue the catalytic combustion process raising the temperature from approximately 1400° F. at the inlet to approximately 1600° F. at the outlet. Thereafter, the partially combusted air-fuel mixture is allowed to fully combust as described above to an output temperature on line 44 of approximately 2400° F. The main turbine control system 38 (see FIG. 3) controls metering valve 36 as described above to increase or decrease the turbine speed in response to increased or decreased electrical or other loads coupled to the electrical generator (not shown) driven by shaft 26. Where this catalytic combustion system includes both a primary pre-burner 54 and a secondary pre-burner 56, the dynamic catalytic control system of the instant invention must coordinate the dynamic control of two metering valves, a metering valve 42' for the primary pre-burner 54, and a metering valve 42" for the secondary pre-burner 56. The detailed description of the particular control structure utilized by a preferred embodiment of the instant invention will be described more fully hereinbelow.

The coordination of the typical gas turbine control structure 38 with the catalytic combustion control 40 of the instant invention within controller 34 (see FIG. 3) allows the controller 34 to continuously monitor and regulate the operation of the catalytic combustion process, while simultaneously managing the turbine governor and air flow control functions. This controller 34 continuously monitors engine condition and combustor operation, performing real time diagnostics to confirm that the subsystems are functioning properly. It manages the fuel delivery to each combustion subsystem to provide proper catalyst activation temperature, turbine acceleration, steady operation under load conditions, and proper dynamic performance under load transients. Throughout the turbine's operating envelope, the controller 34 regulates the combustion system to provide optimum fuel economy and minimal emissions while satisfying the load output and transient demands of the plant operator or plant control system. Preferably, and in addition to the typical control functions, the controller 34 also provides the capability to precisely monitor many functions within the combustion system and the turbine. The controller 34 continuously monitors the turbine and combustion systems and transmits operational data to the plant operator or plant supervisory control system (not shown). This real-time information can be used to monitor or trend the operation of the machine, to detect subtle changes which may reduce machine efficiency, or which may adversely affect the exhaust emissions, or which may indicate wear or damage of the engine, control, or fuel system components. This information may be used for trouble shooting, economic analysis, or to schedule preventative maintenance.

In addition to its real-time control functions, the controller 34 manages the various sequencing functions critical to proper operation and protection of the catalytic combustor 32 and the gas turbine 22. From the time the controller 34 receives instructions from the plant controller or operator to begin the turbine start/stop sequence, the controller 34 manages the ignition system, and the starter system as described above. In coordinated control with the catalytic combustion controller 40, the controller 34 also manages the combustion system to perform the catalyst warm up sequence, turbine acceleration sequence, synchronization of the generator to the utility grid frequency, and manages the load output of the turbine 22. Throughout these operations the controller 34 continuously monitors and independently regulates the fuel delivery systems (fuel metering valves 42', 42", and 36 of FIG. 5), transducers, and shutoff valves to achieve the operating condition desired by the plant control system or operator. In the event that any portion of the combustion system, turbine, or fuel delivery system fails to operate within its specified limits, the controller 34 will enunciate the source of the problem and initiate an appropriate reduction and load. If any portion of the system reaches an unsafe or potentially damaging level, the control will initiate an emergency trip to protect the turbomachinery and catalyst systems also as described above.

The controller 34 regulates the fuel flow rate delivery to each of the combustion subsystems through metering valves 42', 42", and 36 (see FIG. 5). Appropriate instrumentation is provided on each fuel path to continuously update the controller 34 with information on the current pressures, temperatures, and control valve positions for each fuel path. The controller 34 compares the current instrument readings against the desired readings, and adjusts the gas modulating 42', 42", and 36' shutoff valves (not shown) to maintain steady state operation, or to respond to a load transient, load shed, or emergency trip condition as will be described more fully hereinbelow. Utilizing this unique integration of control algorithms of a gas turbine control structure 38 and a catalytic combustor control section 40, instrumentation, and fuel system hardware, the controller 34 monitors the valve position, fuel gas pressure, pressure differential, and gas temperature to compute and modulate the precise mass flow rate delivery through each path.

The following is a description of the various functions performed by controller 34 allowing integration and dynamic control of the gas turbine control structure 38 and the catalytic combustor controller 40. As will be recognized by one or ordinary skill in the art, many of the portions of the control logic, although described individually, require state feedback, instrument readings, and data from other portions of the logic. Therefore, this description is intended to provide a description of the function of the logic, not the particular architecture of the system.

Figure 6:
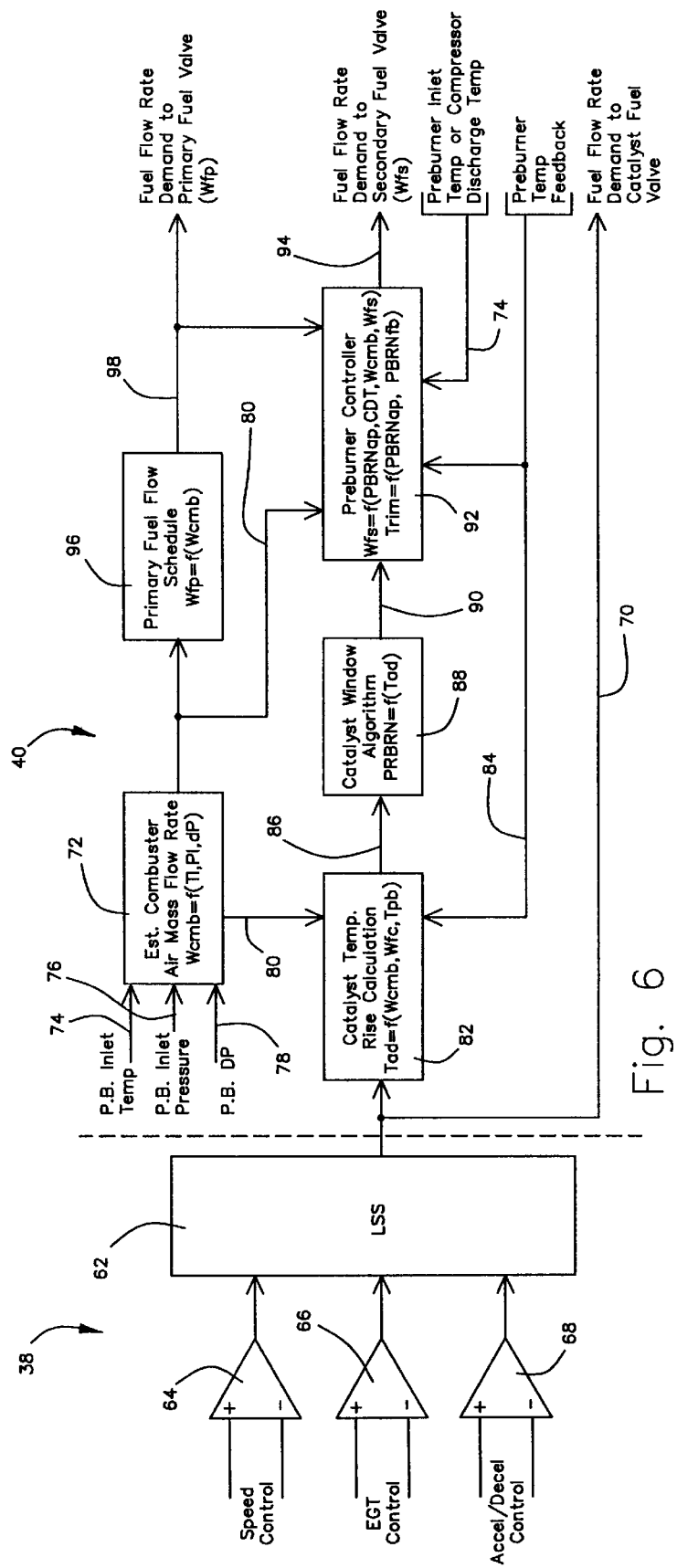
FIG. 6 is a block diagrammatic control diagram illustrating an embodiment of the instant invention.

An exemplary embodiment of the control structure 40 for the catalytic combustor 32 is illustrated in block diagrammatic form in association with a gas turbine control structure 38 in FIG. 6, to which specific reference is now made. The gas control structure 38 generates a fuel demand signal 70 which modulates to sustain the operating requirements of the gas turbine (i.e. speed, load, etc.). Preferably, the gas turbine control structure 38 utilizes a lowest signal select circuit 62 which selects the lowest signal output from the various control parameter inputs to govern the final output to the fuel delivery system 41 (see FIG. 3). Typical control variables for a gas turbine control structure 38 include speed control 64, exhaust gas temperature (EGT) control 66, and acceleration/deceleration control 68. The items to the left of the LSS element 62 represents a set of logic structures depicting several independent regulators operating in parallel, each computing a comparison of its individual setpoints and its setpoint trajectories, with respect to the appropriate signals provide by feedback transducers or state feedback calculations, and updating a required output value, appropriate to achieve its setpoint. The output of these regulators are connected to the low signal select function 62. The LSS algorithm passes only the output value of the lowest regulator to the subsequent catalytic combustion control structures. Although the regulator design can be derived and implemented in terms of several variables. In one exemplary approach, each regulator output, in addition to the LSS device is scaled in terms of a fuel flow rate demand to the catalyst fuel metering valve. An alternate embodiment of this approach is to scale the regulators and the LSS output in terms of an exit temperature required from the catalytic combustion system. As each regulator modulates it's individual outputs, endeavoring to satisfy its current setpoint conditions, only the lowest output will be used to regulate the combustor. As will be recognized by one skilled in the gas turbine control art, various other control parameters may be utilized for the gas turbine control structure, and the particular choice of a gas turbine control structure 38 shall not limit the scope of the instant invention as defined by the claims appended hereto. Of importance is the fuel flow rate demand signal 70 produced by the gas turbine control structure 38 as a response to its typical control algorithms to sustain the operating requirement of the gas turbine engine.

A preferred embodiment of the catalytic combustion control structure 40 utilizes this fuel flow rate demand signal 70 produced by the gas turbine control structure 38 to maintain proper operating conditions for the catalytic combustor 32. Specifically, the embodiment of the catalytic combustion control structure 40 illustrated in FIG. 6 calculates the combustor air mass flow rate in control block 72 based upon the pre-burner inlet temperature 74, the pre-burner inlet pressure 76, and the pre-burner differential pressure 78 as will be described more fully below with reference to FIG. 7. By calculating the actual mass flow rate of the air into the combustor, the catalytic combustion control structure 40 is able to maintain accurate control over the catalytic combustion process regardless of the efficiency of the gas turbine engine compressor. That is to say, by calculating the actual combustor air mass flow rate into the catalytic combustion module, this control structure 40 is not dependent upon the age or efficiency of the gas turbine engine itself.

Figure 7:
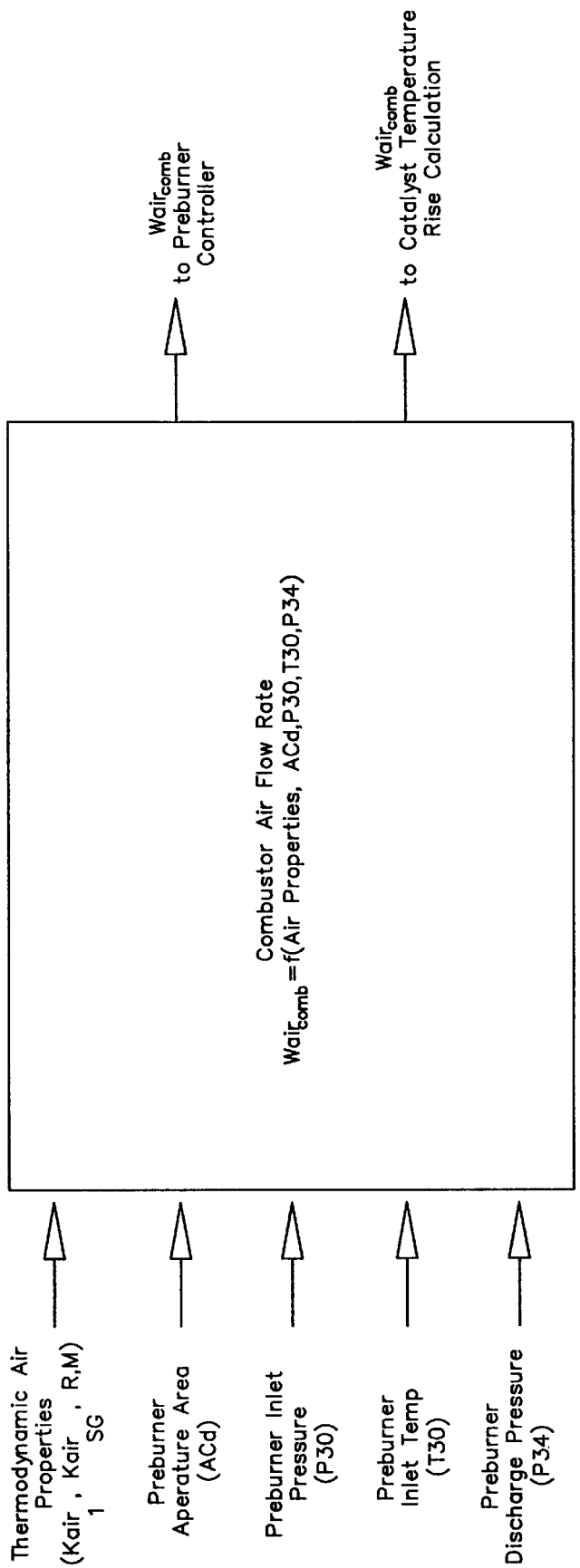
FIG. 7 is a partial control block diagram illustrating in greater detail the calculation of combustor air mass flow rate in accordance with an embodiment of the instant invention.

This pressure differential method of calculating the combustor air and mass flow rate is illustrated in greater detail in FIG. 7. As may be seen from reference to this figure, the calculation of the combustor air mass flow rate is a function of air properties, such as air ratio of specific heats, and the air's specific gravity, as well as a function of the preburner aperture area, the preburner inlet pressure, the preburner inlet temperature, and the preburner discharge pressure. An exemplary calculation of the combustor air mass flow rate in LBM/HOUR is as follows:

$$Wair_{comb} = 3955.289 * ACd_1 * P30 * \sqrt{\left[\frac{K_{air} * K_{sg}}{(K_{air} - 1) * T30}\right] * [R7^a - R7^{a1}]}$$

Where:

$a = 2/K_{air}$ $a1 = (1 + K_{air})/K_{air}$

R7+P34/P30 if P34/P30>$P_{critical}$

R7+$P_{critical}$ if P34/P30<$P_{critical}$ $P_{critical} = (2/(K_{air}+1))^{(K_{air}/K_{air}-1))}$ An alternate calculation may be performed as follows:

$$Wair_{comb} = 3600 * ACD_2 * \sqrt{(2 * Rho * (P30 - P34 * (g_c/144))}$$

Where

Rho=P30/((R/M)*T30)

$g_c$=acceleration of gravity(ft/sec$_2$).

Figure 12:
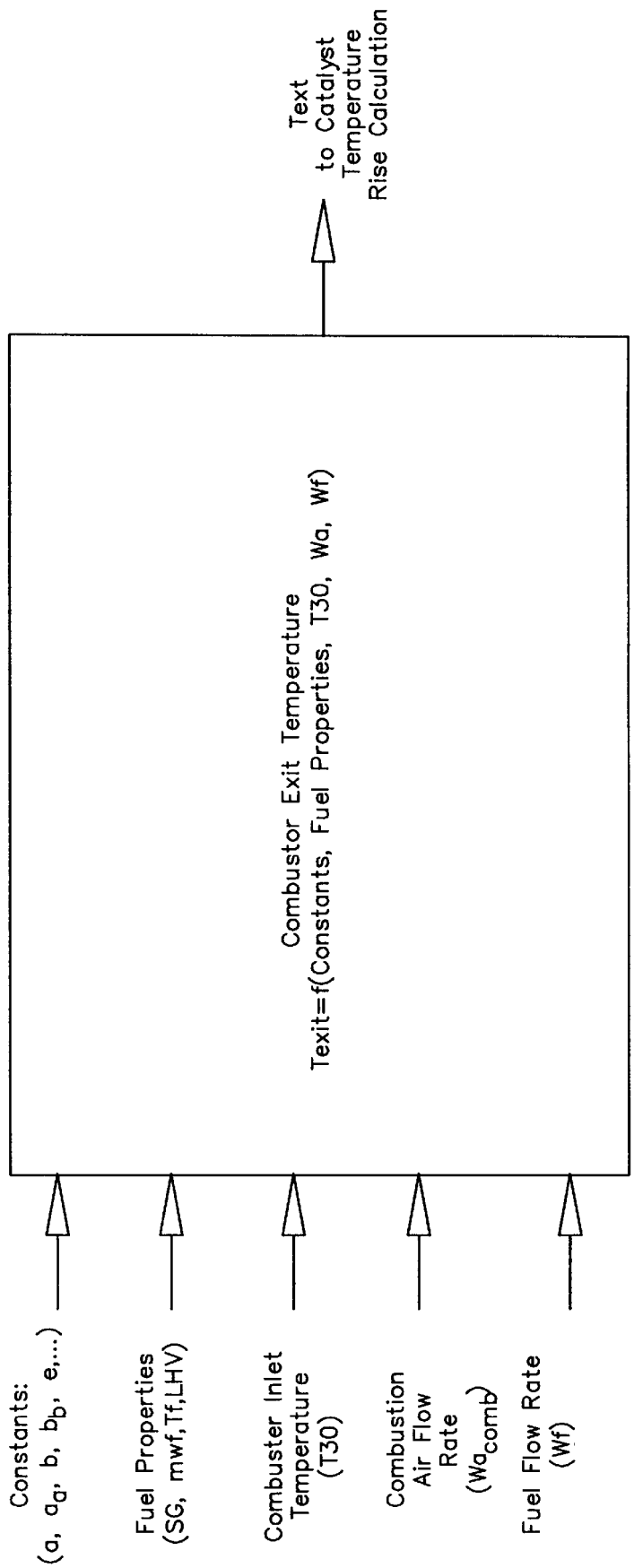
FIG. 12 is a partial control block diagram illustrating in greater detail the calculation of combustor exit temperature in accordance with an embodiment of the instant invention.

Based on the calculated air mass flow rate 80, and on the fuel flow rate demand control signal 70 calculated by the gas turbine control structure 38, control block 82 calculates a temperature rise across the catalyst module. This calculation 82 also takes into account a pre-burner temperature feedback signal 84. This calculated catalyst temperature rise signal 86 is utilized by control block 88 to determine the optimum pre-burner discharge temperature 90 to be utilized by the pre-burner controller 92 as its set point. Based on the calculated air mass flow rate 80, the pre-burner inlet temperature 74, the optimum temperature set point 90 as described below with reference to FIGS. 13 and 14, and primary pre-burner fuel flow rate 98, the appropriate amount of fuel to be delivered to the secondary pre-burner is computed 94 to achieve the desired exit temperature as will be described with reference to FIG. 12. A closed loop control feedback 84 is used to trim this estimated value for the exact operating point. Operation at precisely the correct temperature minimizes emissions, and improves fuel efficiency. This calculated value and closed loop control output provides good transient performance despite any thermocouple lag which may typically exist with the use of conventional thermocouples. Specifically, as illustrated in FIG. 12, the combustor temperature rise algorithm for the calculation of the combustor exit temperature is a function of various constants, the properties of the particular fuel utilized in the system, the combustor inlet temperature, the combustion airflow rate as calculated in accordance with the combustor airflow algorithm described above, and the fuel flow rate.

The various coefficients include temperature rise coefficients, and the fuel properties include the fuels heating value, and its molecular weight. An exemplary calculation of the exit temperature and degrees kelvin is as follows:

$$Texit = \frac{-a + \{a^2 + ((2*b)*(a*T30 + 0.5*b*T30^2 + (yf*Hc)))\}^{0.5}}{b}$$

Where
a=temperature rise coefficient (e.g., 6.60)
b=temperature rise coefficient (e.g., 1.24)

$$yf = \frac{(Wf)/mwf}{((Wf)/mwf) + (Wa_{comb}/mwair)}$$

An alternate exemplary calculation to yield the exit temperature in degrees kelvin is as follows:

$$Texit = \frac{-B + (B^2 - 4*A*C)^{0.5}}{2*A}$$

Figure 13:
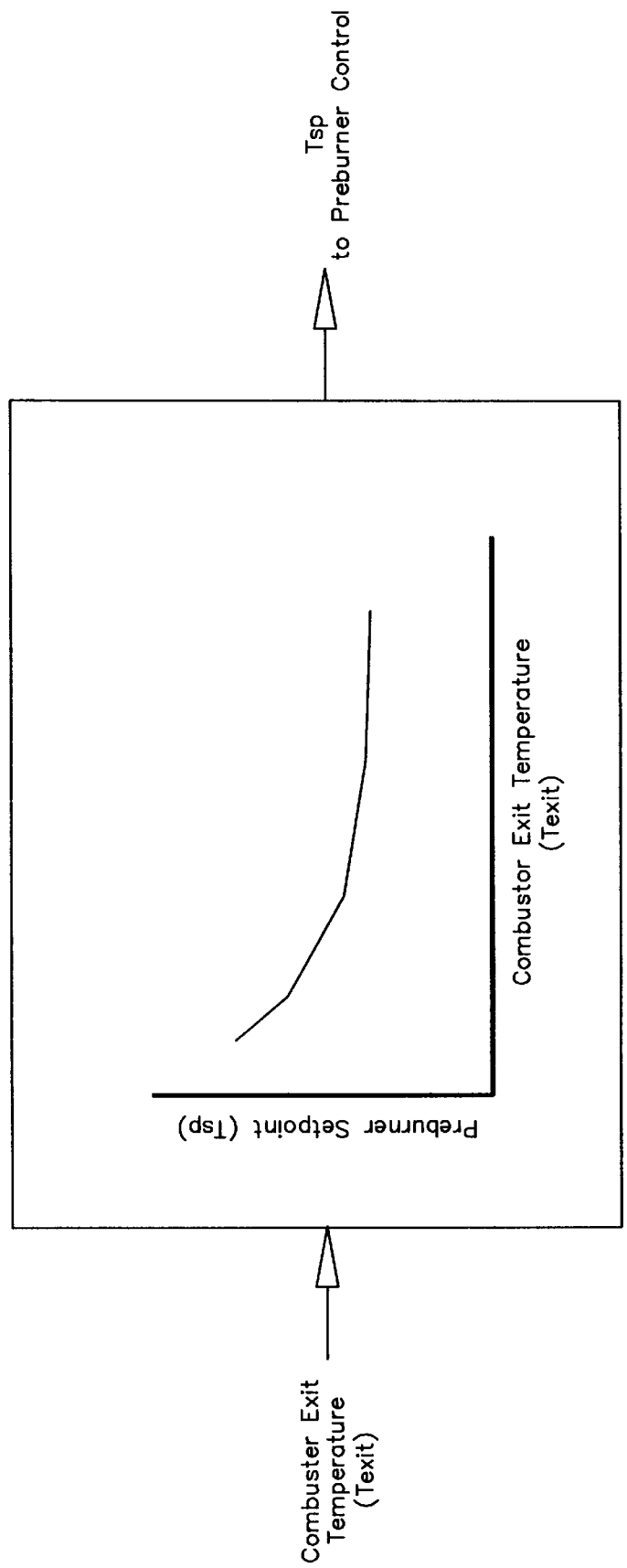
FIG. 13 is a partial control block diagram illustrating in greater detail the calculation of the optimum preburner setpoint in accordance with an embodiment of the instant invention.
Figure 14:
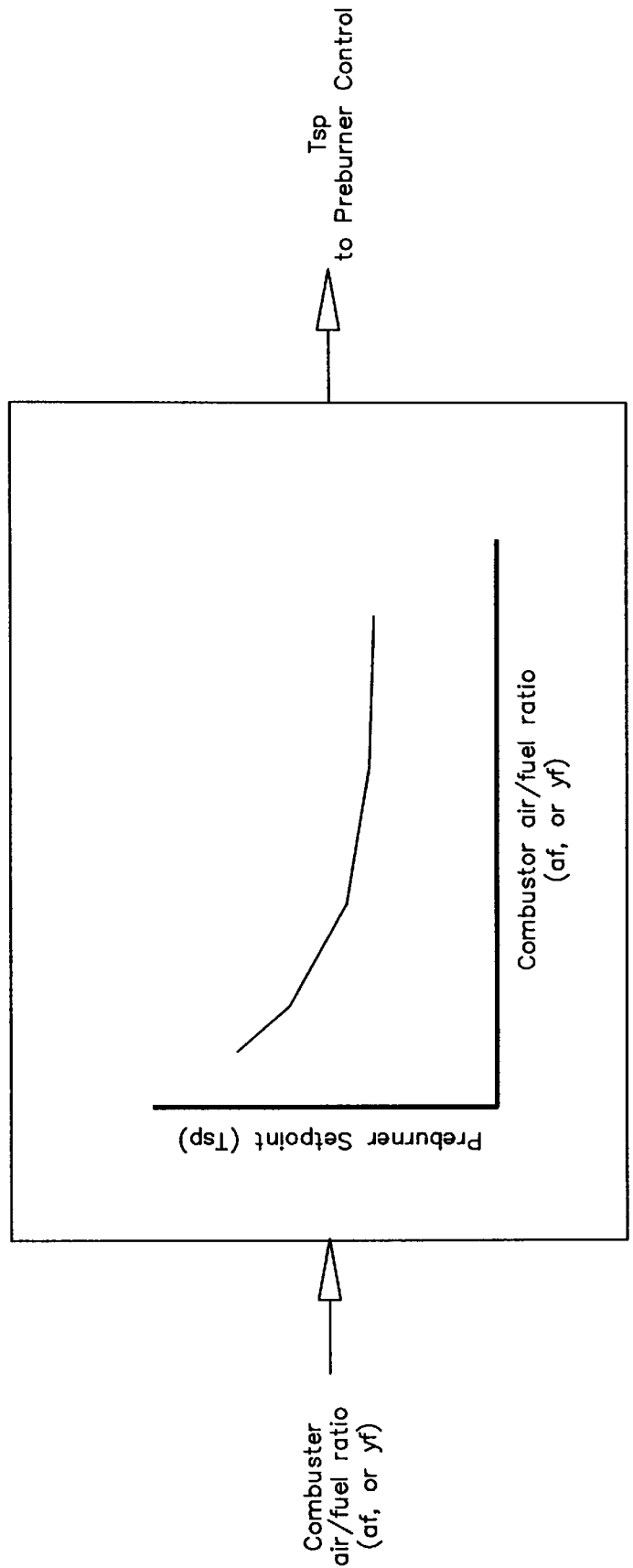
FIG. 14 is a partial control block diagram illustrating in greater detail the calculation of the optimum preburner setpoint in accordance with an alternate embodiment of the instant invention.

Where:
af=$(Wf/Wa_{comb})$SG
A=$[b_{P1}+(b_{P2}*af)]/2$
B=$a_{P1}+(a_{P2}*af)$
$dH_a=a_a*(T_{rxn}-T30)+b_a/2*(T_{rxn}^2-T30^2)$
$dH_f=a_f*(T_{rxn}-Tf)+b_f/2*(T_{rxn}^2-Tf^2)$
C=$(dH_a+af*dH_f)-(af*LHV)-(B*Trxn)-(A*Trxn^2)$ In an embodiment of the instant invention, the determination of the optimum preburner set point based on the catalyst exit temperature is illustrated in FIG. 13. Based on the calculated exit temperature of the catalyst module, a calculation is made to determine the optimum preburner discharge temperature as described above. This value is directed to the set point of the preburner controller. As illustrated in FIG. 13, either a lookup table or a calculation may be performed in accordance with FIG. 13. Alternatively, an embodiment of the instant invention may determine the optimum preburner set point in accordance with the catalyst air/fuel ratio as illustrated in FIG. 14. In this alternate embodiment, a calculation is made based on the calculated air fuel ratio delivered to the catalyst module to determine the optimum preburner discharge temperature. This value is also directed to the set point of the preburner controller, and may constitute a look up table or a calculation in accordance with FIG. 14.

Essentially, the catalyst flow rate demand is processed by a set of calculations where the current exit temperature is computed. The result of this catalyst exit temperature calculation is used to compute the optimum catalyst inlet temperature. Based on the difference between the preburner setpoint and the measured temperature, in conjunction with the calculated estimate of combustor air flow, the amount of fuel flow required to achieve the preburner setpoint is recomputed and the output of the preburner fuel control valve(s) modified appropriately. The readings of the transducers are also monitored and the steady state output of the preburner adjusted precisely to match the setpoint. Thus, as the plant output demand changes, or as any of the intermediate process variables change, the Digital Control System continuously recomputes the required catalyst fuel flow output, recomputes a new preburner setpoint, and redirects the outputs to the preburner control valve(s) and catalyst fuel valve(s) as required to match the plant requirements. By recorrecting the fuel valve outputs immediately after sensing a change in demand, the preburner and catalyst combustion systems are very rapidly regulated to the desired levels, resulting in rapid transient response of the combustion system. This rapid dynamic performance is ideal for systems which must respond quickly to changes in demand or load, such as electrical generating packages, or propulsion systems.

In systems which utilize both a primary and a secondary pre-burner (the primary pre-burner serving mainly as a pilot flame for the secondary pre-burner), calculation block 96 is included to control the fuel flow rate demand 98 to this primary pre-burner. The computation utilizes the calculated combustor air mass flow rate to ensure a stable pilot flame and optimum emissions from the primary combustor. When such a primary pre-burner is utilized, its output fuel flow rate demand signal 98 is also taken into consideration by the pre-burner controller 92 to account for the temperature rise resulting therefrom in the pre-burner section of the catalytic combustor. These control signals 98, 94, 70 are used to modulate the fuel metering valves 42', 42", and 36 respectively illustrated in FIG. 5.

As noted in previous sections, the optimum performance of the catalyst module is attained, throughout the range of air fuel ratio required by the plant, by modulation of the preburner exit temperature. Due to the close relative proximity of the preburner discharge to the catalyst inlet, these two temperatures are very close in value. Thus by controlling the preburner discharge temperature, the catalyst inlet temperature is also controlled The process is accomplished by the dynamic control system by utilization of an integrated set of functions or algorithms, processed within the Platform whereby mathematical representations of the internal flow dynamics, simplified models of the thermodynamic combustion process, and readings from the various temperature sensors monitoring the various process temperatures and pressures are used to continuously trim the preburner output to the setpoint required by the design trajectory. This regulation of the preburner output temperature yields optimum performance of the catalytic combustion system throughout its operating range of air fuel ratio.

An additional function of the instant invention is to limit the maximum preburner exit temperature at or below its design limit. This function ensures that the structural and functional integrity of the sub-systems downstream of the preburner are protected by the operation of the instant invention, such that the overall life and performance is maintained over an acceptable service life. The preburner exit temperature limiting function is effected by comparing the output of the preburner exit temperature to the preburner setpoint Tsp, and to a set of maximum limits. An example logic sequence is as follows:

If the absolute value of Tsp−T34>T34 Tracking Limit #1
then T34 Control Error=True Where Tsp is the preburner setpoint, T34 (measured) is the preburner exit temperature, and Tracking Limit #1 is a predetermined maximum allowance between the setpoint and measured preburner temperature. In a preferred embodiment of the invention, the tracking allowance is increased if the preburner setpoint is changing, such that a wider tolerance is allowed during transient operation. T34 Control Error is an example output variable used as a logic flag within the control to indicate that the preburner temperature output is not within an acceptable tolerance.

An additional logic sequence ensures that the maximum metallurgical limits are not exceeded. An example of this logic sequence is as follows:

If T34>T34 Thermal Limit #1 then T34 Over Temperature=True

Where T34 (measured) is the preburner exit temperature, T34 Thermal Limit is a predetermined maximum limit for the preburner exit temperature, and T34 Over Temperature is an example output variable used as a logic flag within the control to indicate that the preburner temperature is above the acceptable limits.

If the exit temperature reaches or exceeds this limit, the dynamic control system can initiate an alarm or trip sequence. Additionally, the dynamic control system will not increase the fuel flow above the level resulting in this maximum exit temperature, thus protecting the main gas mixer, catalyst module, and other components in the hot gas path from any further increase in temperature from the preburner. If the preburner exit temperature were to exceed the maximum design limit, above which damage might occur to the combustor, the logic flag is used to initiate an emergency trip. This trip sequence is effected by the dynamic control system by immediate closure of the fuel valves to all paths, thus terminating the combustion process. The state of the non-uniformity condition(s) are latched (maintained at a high state) within the system, buffered, and communicated to an operations panel so that the condition causing the shutdown is known.

An additional function of the instant invention is to compute a series of algorithms which continuously yield an approximation of the temperature rise produced by the catalyst module as a function of calculated air/fuel ratio. This temperature rise, or alternatively the air fuel ratio passing through the catalyst module, is used to determine the optimum preburner temperature to affect the best performance of the catalyst module. Thus, the dynamic control system manages the temperature rise produced by the combination of the preburner and catalyst module subsystems, to regulate the final output of the combustion system, in accordance to the requirements of the plant, while simultaneously and dynamically adjusting or optimizing the performance of the preburner, to effect the best performance of the catalyst module. A block diagram, illustrating the logic structure for determination of optimum preburner setpoint is illustrated in FIGS. 13 and 14.

An additional function of the instant invention is to limit the maximum catalyst exit temperature T38, and the maximum combustor exit temperature TAD at or below its design limit. These functions, which effectively result in precise regulation of the fuel delivery to the various combustion sub-systems as controlled by the instant invention ensure that internal subsystem combustion temperatures are maintained below 2400 degrees Fahrenheit, thus reducing the production of CO and $NO_x$ emissions. This function is effected by comparing the output of the calculated exit temperature to one or more predetermined limits. An exemplary logic sequence is as follows:

If Texit>Exit Limit #1 then Exit Overtemp #1=True

Where Texit(calculated) is the calculated combustor exit temperature, Design Limit #1 is a predetermined maximum allowance for combustor exit temperature, and Max. Exit Temp Limit #1 is an exemplary output variable used as a logic flag within the control to indicate that the preburner temperature uniformity is not within the acceptable limits.

If the exit temperature reaches or exceeds this limit, the system of the instant invention can initiate an alarm or trip sequence. Additionally, the dynamic control system will not increase the fuel flow above the level resulting in this maximum exit temperature, thus protecting the catalyst module, burn-out zone, and other components in the hot gas path from any further increase in temperature from the combustion system. If the exit temperature were to exceed the maximum design limit above which damage might occur to the combustor, a separate, higher limit is used to initiate an emergency trip. This trip sequence is effected by the dynamic control system by immediate closure of the fuel valves to all paths, thus terminating the combustion process. The state of the non-uniformity condition(s) are latched (maintained at a high state) within the system, buffered, and communicated to an operations panel so that the condition causing the shutdown is known.

In an additional, preferred function of the instant invention, the catalyst inlet temperature sensors are used (when provided) to identify any occurrences of auto-ignition which may occur if the premixed gas in the region upstream of the catalyst are subjected to a spark, or other non-uniform temperature source, sufficient in energy to result in the ignition of the premixed catalyst gasses. In the event that an auto-ignition sequence is detected, the rate of catalyst fuel flow is immediately reduced by a variable fraction of the nominal demand such that combustion of this lean premixed fuel is extinguished. In the event that the catalyst inlet temperature, or preburner exit temperatures sensors indicate that sustained combustion is present in the preburner or mixing zones, and if reduction of the catalyst fuel flow rate fails to eliminate this problem, the dynamic control system will initiate a safety shutdown by closing all the fuel control valves, thus stopping the combustion process. If however, the catalyst interstage temperatures are reduced to the appropriate level, after the auto-ignition event, the catalyst fuel flow rate will be restored to the full value required to satisfy the requirements of the plant. These auto-ignition detection and avoidance functions can be effected quite quickly, such that overall operation of the plant is maintained despite a slight, momentary dip in output.

Figure 8:
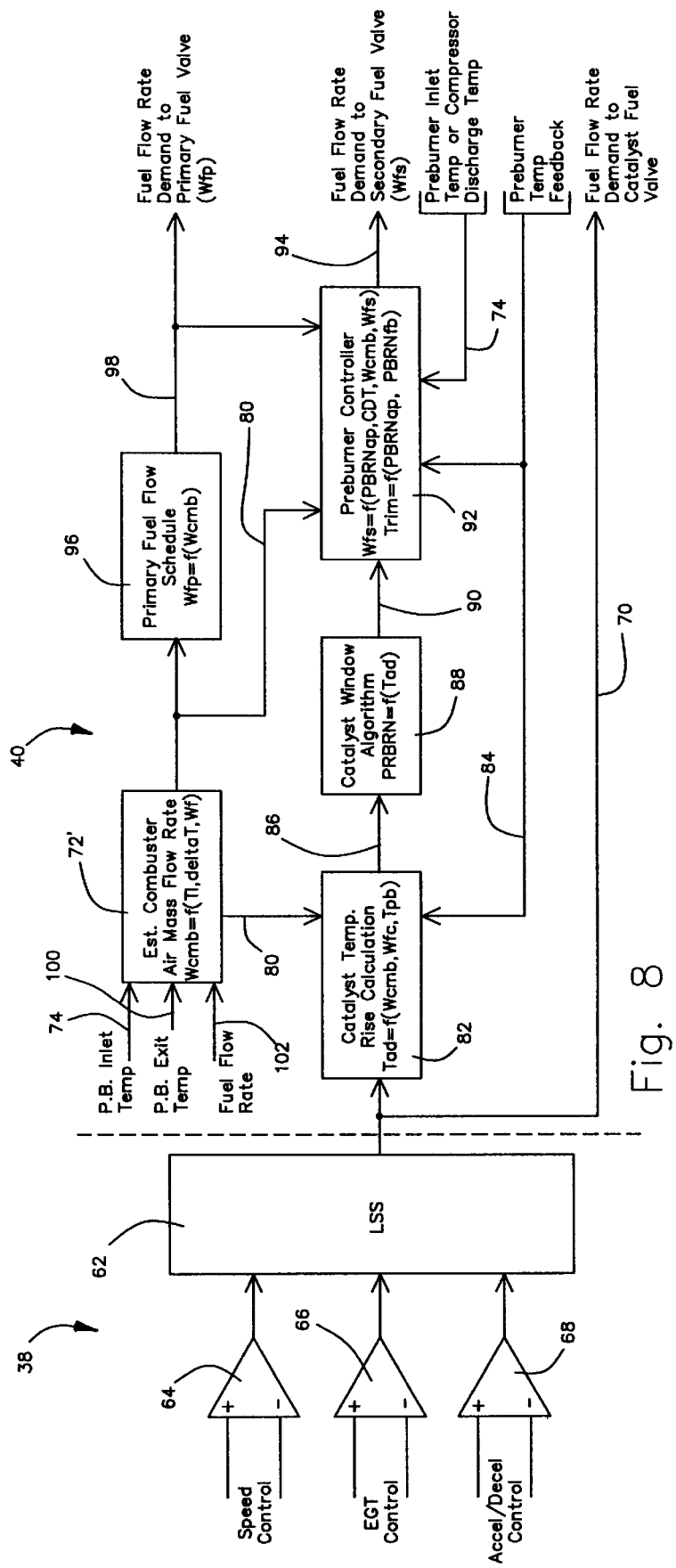
FIG. 8 is a block diagrammatic control diagram illustrating an alternate embodiment of the instant invention.
Figure 9:
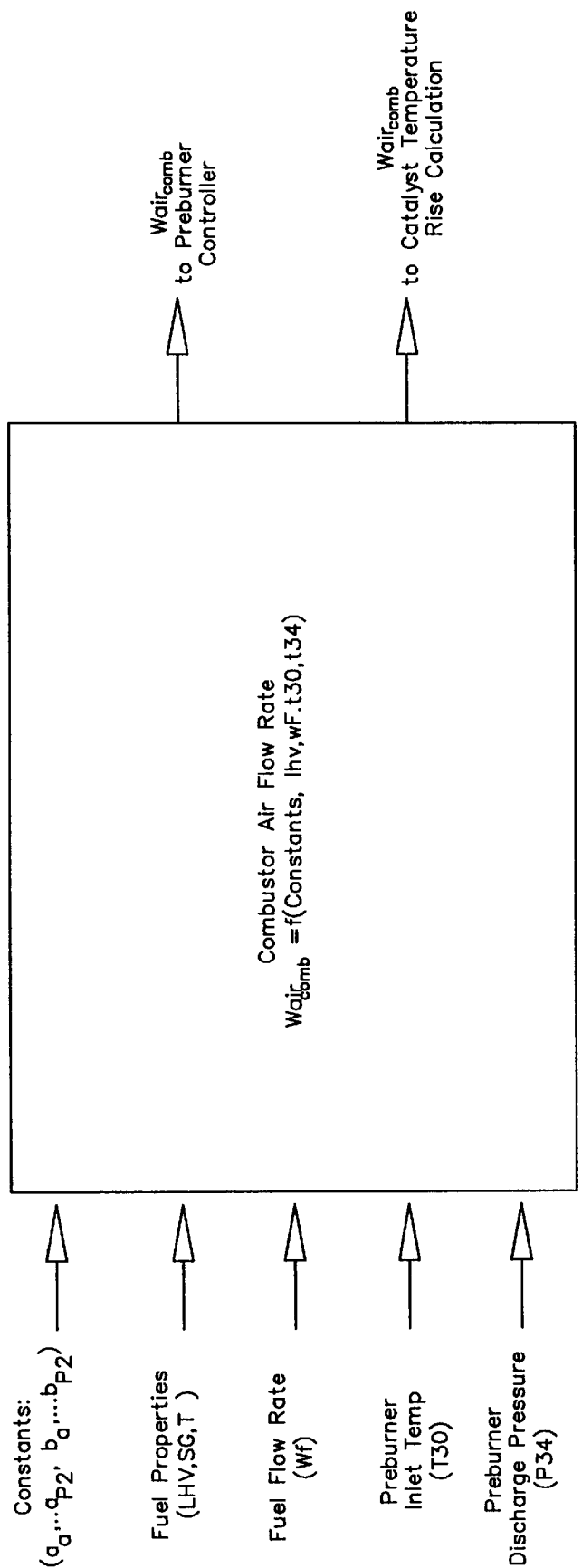
FIG. 9 is a partial control block diagram illustrating in greater detail the calculation of combustor air mass flow rate in accordance with an alternate embodiment of the instant invention.

An alternate preferred embodiment of the catalytic combustion control structure 40 is illustrated in FIG. 8. In this alternate embodiment, the control structure 40 calculates the air mass flow rate into the catalytic combustor based upon the pre-burner inlet temperature 74, the pre-burner exit temperature 100, and the total pre-burner fuel flow rate 102 in calculation block 72'. Once this air mass flow rate 80 has been calculated, the catalytic combustion control 40 operates as described above. The calculation of the combuster airflow in this embodiment of the instant invention utilizes a temperature rise method, the function of which is illustrated in FIG. 9. As may be seen from FIG. 9, the calculation of the combuster air mass flow rate is a function of various constants, fuel properties, the fuel flow rate, preburner inlet temperature, and preburner discharge temperature. The constants include temperature rise coefficients, and the fuel properties include the fuel heating value, as well as its specific gravity. An exemplary calculation in accordance with FIG. 9 is as follows:

$$Wair_{comb} = \frac{WF}{SG} * \frac{(2*b*LHV) - [(a+b*T34)^2 - (a+b*T30)^2]}{[(a+b*T34)^2 - (a+b*T30)^2]}$$

Where:

a=temperature rise coefficient (e.g., 6.60)

b=temperature rise coefficient (e.g., 0.00124)

Figure 10:
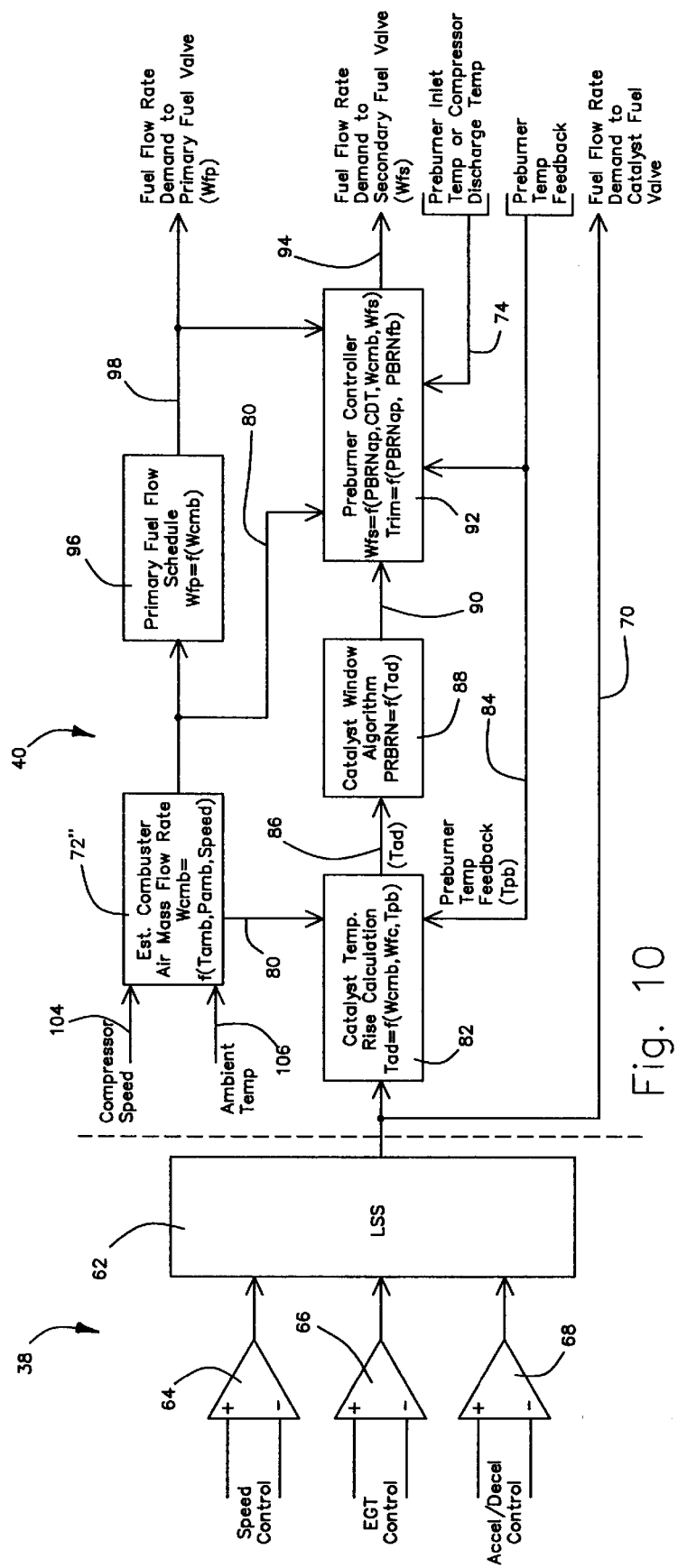
FIG. 10 is a block diagrammatic control diagram illustrating an additional alternate embodiment of the instant invention.
Figure 11:
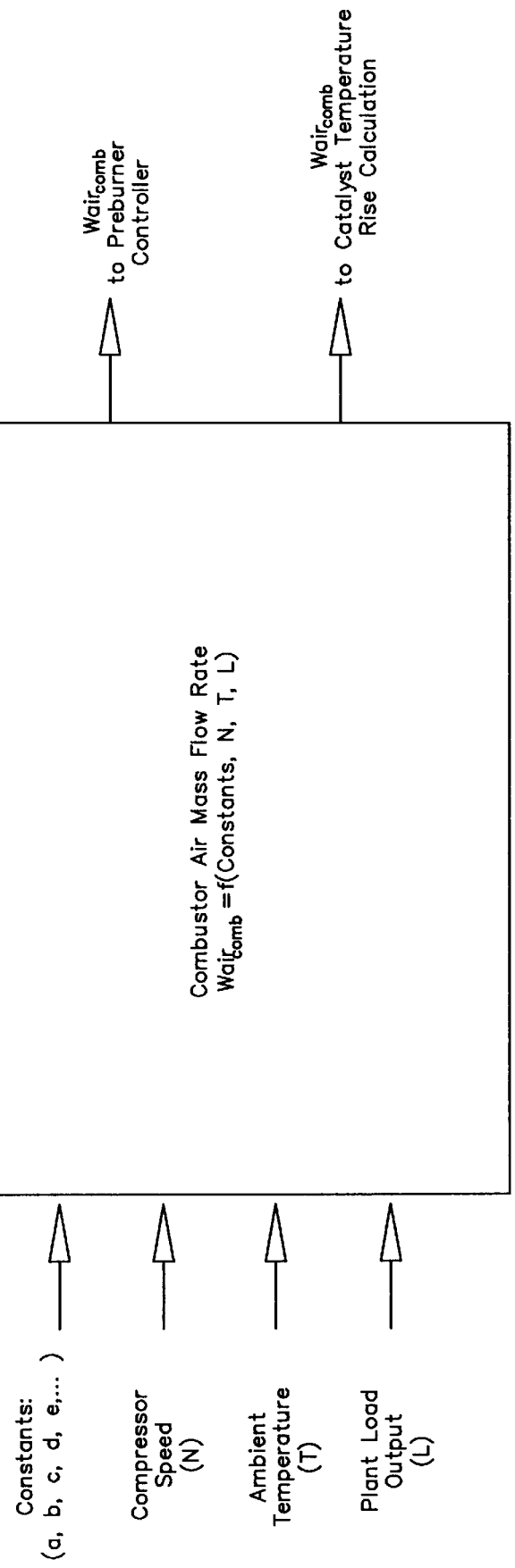
FIG. 11 is a partial control block diagram illustrating in greater detail the calculation of combustor air mass flow rate in accordance with a further alternate embodiment of the instant invention.

An alternate exemplary calculation may be made as follows:

$$Wair_{comb} = Wf/af$$

Where $af = (dH_a + dH_{P1})/(LHV - dH_f - dH_{P2})$ $dH_a = a_a*(Trxn-T30) + b_a/2*(T_{rxn}^2 - T30^2)$ $dH_f = a_f*(Trxn-T_f) + b_f/2*(T_{rxn}^2 - T_f^2)$ $dH_{P1} = a_{P1}*(T34-Trxn) + b_{P1}/2*(T34^2 - T_{rxn}^2)$ $dH_{P2} = a_{P2}*(T34-Trxn) + b_{P2}/2*(T34^2 - T_{rxn}^2)$ A further alternate preferred embodiment of the instant invention is illustrated in FIG. 10. As may be seen, the basic control structure of the catalytic combustion control 40 remains unchanged from the previous two embodiments. However, in this embodiment the calculation block 72″ estimates the combustor air mass flow rate as a function of the compressor speed 104, the ambient temperature 106, and ambient pressure. Specifically, FIG. 11 illustrates the functional block calculation of the combustor airflow based on a compressor or plant model method. As may be seen from FIG. 1, this method calculates the combuster air mass flow rate as a function of various constants, the compressor speed, ambient temperature, and the normalized plant load output. An exemplary calculation in accordance with this embodiment is as follows:

$$Wair_{comb} = [(K_{comb}/(100* Tbias))*\{a*(N/Tbias)^3 + b*(N/Tbias)^2 + c*(N/T_{bias})\}] - Lbias$$

Where $Lbias = d + e*L$ $Tbias = (Tamb/Tstd)^{0.5}$

Alternatively, the combuster air mass flow rate may be calculated from combustor air flow readings from a suitable flow meter.

In this embodiment, calculation block 72″ provides only an estimate of the combustor air mass flow rate based upon given compressor efficiencies and operating parameters. This model based air mass flow rate calculation provides adequate accuracy for new and well maintained gas turbine engines. However, as the gas turbine engine ages, its actual efficiency may differ somewhat from its actual operating efficiency such that the estimated combustor air mass flow rate 80 from calculation block 72″ differs slightly from the actual combustor air mass flow rate flowing into the catalytic combustor. As would be recognized by one skilled in the art, the embodiments illustrated in FIGS. 6 and 8 which actually calculate the combustor air mass flow rate will provide enhanced performance over the embodiment illustrated in FIG. 10.

In a preferred embodiment of the instant invention, multiple air flow algorithms are processed simultaneously within the dynamic control system. The ideal compressor model described in relation to FIG. 11 is initially calibrated to the results of the combustor pressure differential and temperature rise algorithms shortly after installation, and at a known set of operating conditions. Since the airflow based on the compressor model does not include a provision for reductions due to wear or deterioration of the actual hardware, it will always produce a set of outputs which represents the "As New" performance of the compressor. As the compressor deteriorates due to fouling or wear, the combustor air flow rate, as calculated using the alternate implementations as described above will detect these changes in airflow. By computing the ratio of the idealized airflow to the measured airflow, and placing limits on the expected deviation, an alarm can be enunciated if the reduction in airflow falls below a predetermined limit. An example logic structure is as follows:

If $Wair_{comb\Delta P\ or\ \Delta T}/wair_{combmodel} <$ Wair Tolerance #1 then
   Comb. Air Degradation=True Where $Wair_{comb\ model}$=combustor air flow rate derived by compressor model) $Wair_{comb\ \Delta P\ or\ \Delta T}$=combustor air flow rate derived by pressure differential or temperature rise methods), Wair Tolerance #1 is a predetermined minimum ratio of measured to ideal compressor airflow, Comb Air Degradation #1 is an example output variable used as a logic flag within the control to indicate that the measured compressor air flow rate is not within the acceptable limits.

Figure 15:
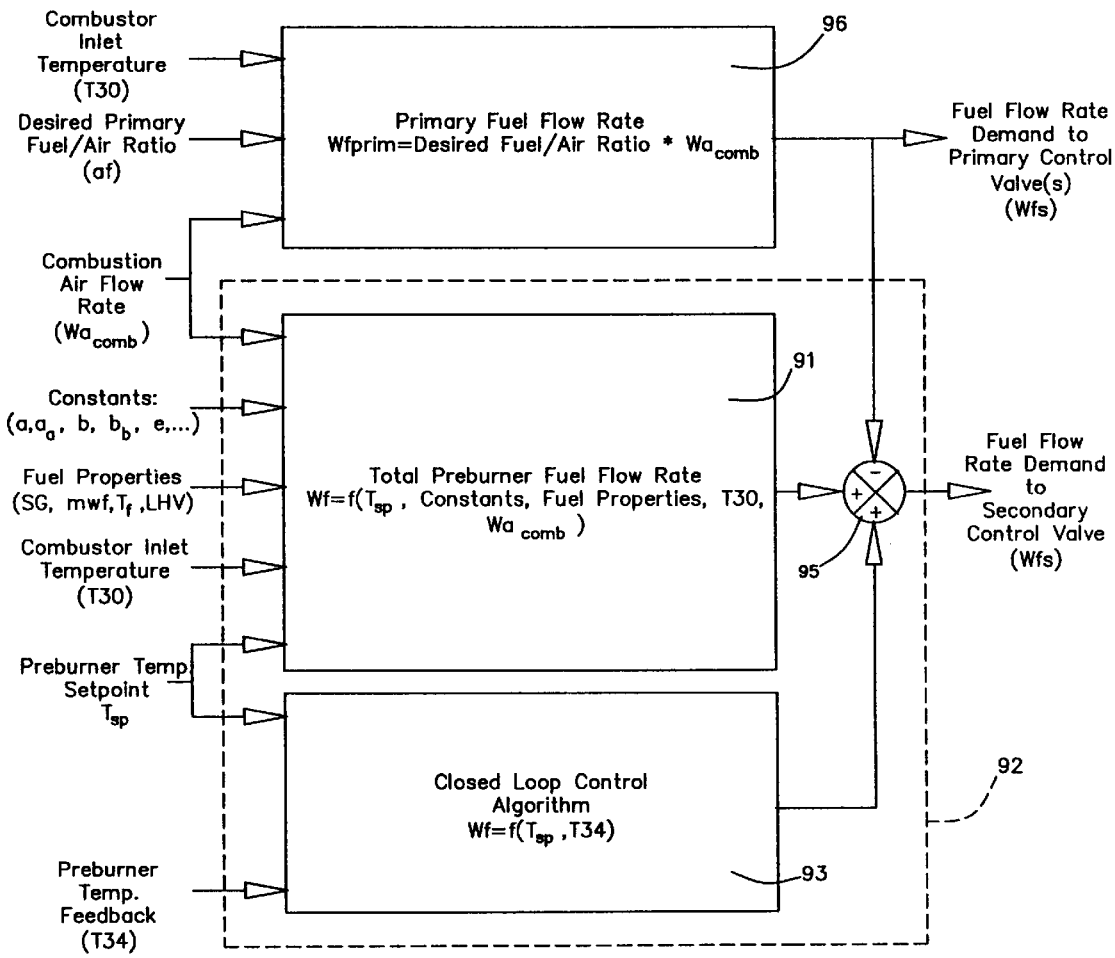
FIG. 15 is a partial control block diagram illustrating the calculation of the preburner fuel delivery in accordance with an embodiment of the instant invention.

FIG. 15 illustrates in greater detail calculation blocks for the primary fuel flow rate 96 as well as the preburner controller block 92. As may be seen from the exemplary embodiment illustrated in FIG. 15, the preburner controller 92 includes a total preburner fuel flow rate calculation block 91, and a closed loop control algorithm 93 which are summed at summation point 95. The fuel flow rate demand to the primary control valves is also subtracted from this summation at the summation point 95 to calculate the final fuel flow rate demand to the secondary control valve. An exemplary calculation for the total preburner fuel flow rate in functional block 91 is as follows:

$$Wf = Wa_{comb}*SG*\frac{[(a+b*Tsp)^2-(a+b*T30)^2]}{(2*b*Hc)-[(a+b*Tsp)^2-(a+b*Tin)^2]}$$

Where a=temperature rise coefficient (e.g., 6.60)

b=temperature rise coefficient (e.g., 1.24)

Alternatively, the total preburner fuel flow rate may be calculated as follows:

$Wf = Wa_{comb}*WG*af$

Where $af = (dH_a+dH_{P1})/(LHV-dH_f-dH_{P2})$ $dH_a = a_a*(Trxn-T30) + b_a/2*(Trnx^2 - T30^2)$ $dH_f = a_f*(Trxn-T_f) + b_f/2*(Trxn^2 - T_f^2)$ $dH_{P1} = a_{P1}*(Tsp-Trxn) + b_{P1}/2*(Tsp^2 - T_{rxn}^2)$ $dH_{P2} = a_{P2}*(Tsp-Trxn) + b_{P2}/2*(Tsp^2 - T_{rxn}^2)$ Each of the illustrated embodiments of the instant invention calculate the required fuel flow rate to both a primary and secondary pre-burner to ensure optimum operating characteristics of the catalytic combustor. When the gas turbine engine is operating at high levels, the higher fuel to air ratio mix produced by the fuel flow rate demand from the gas turbine engine controller 38 results in a higher temperature rise across the catalyst bed due to the increased energy available from the increased fuel flow. During these conditions, the catalytic combustion control 40 will lower the pre-burner temperature of the air flow therein to compensate for the increased energy generated from the increased flow rate of the fuel. This maintains the combustion temperature required by the plant while maintaining optimum combustion conditions through the catalyst bed. On the other hand, during periods of light load, or during an idle condition, the optimum catalytic combustion is maintained by increasing the catalyst inlet temperature due to the minimum temperature rise across the catalyst bed from the lean supply of fuel therethrough. The catalytic combustion control 40 of the instant invention compensates throughout the range from idle to full power conditions, as well as for all dynamic operating points therebetween, by controlling the fuel flow to both the primary and secondary pre-burners of the system. Preferably, the primary pre-burner serves as a pilot for the secondary pre-burner as described above, and provides approximately 20–30% of the required inlet air temperature heating, while the secondary pre-burner provides between the remainder of the inlet air temperature heating to maintain optimum catalytic combustion within the catalyst bed.

The catalytic combustion control 40 utilizes analytical models of the combustor and turbine such that a difference between the model predicted value and measured value may be utilized to enunciate a sensor failure within the system. The analytical models may also be utilized for predictive control to aid in the reduction of sensor lag during transient operation of the system.

Furthermore, a difference between the predicted values of the analytical models and the measured values may be utilized as a cross check for life service of the combustor indicating a decrease in efficiency and need for service of the gas turbine engine.

In systems which utilize both a primary and a secondary pre-burner, or alternatively a pilot preburner, primary preburner, and a secondary preburner (additional preburners are added to improve the overall turn down of the preburner, or to improve the combustion efficiency of the subsequent preburner stages), the fuel flow rates from the various outputs of the pilot and/or primary control algorithms are subtracted from the secondary preburner flow demand. Thus, since additional upstream preburners contribute some additional temperature rise in proportion to the amount of fuel being combusted therein, the additional amount of fuel can be subtracted from the output of the secondary fuel flow output as shown in FIG. 15. Numerous modifications and alternative embodiments of the invention will be apparent to those skilled in the art in view of the foregoing description. Accordingly, this description is to be construed as illustrative only and is for the purpose of teaching those skilled in the art the best mode for carrying out the invention. The details of the structure and architecture may be varied substantially without departing from the spirit of the invention, and the exclusive use of all modifications which come within the scope of the appended claims is reserved.

What is claimed is:

1. A method of controlling a catalytic combustion process within a combustor having at least a first pre-burner and at least one catalyst module therein, comprising the steps of:

calculating a mass flow of air introduced into the combustor;

monitoring a fuel flow to be combusted within the combustor;

monitoring a temperature of the air introduced into the combustor;

calculating an inlet temperature set point for the catalyst module based on the air mass flow and the fuel flow to be combusted; and controlling at least the first pre-burner to heat the air introduced into the combustor based on the inlet temperature set point, the air mass flow, and the temperature of the air introduced into the combustor.

2. A method of controlling a catalytic combustion process within a combustor having at least a first pre-burner and at least one catalyst module therein, comprising the steps of:

calculating a mass flow of air introduced into the combustor;

monitoring a fuel flow to be combusted within the combustor;

monitoring a temperature of the air introduced into the combustor;

calculating an inlet temperature set point for the catalyst module based on the air mass flow and the fuel flow to be combusted;

controlling at least the first pre-burner to heat the air introduced into the combustor based on the inlet temperature set point, the air mass flow, and the temperature of the air introduced into the combustor; and said step of calculating a mass flow of air introduced into the combustor comprises the steps of:

monitoring a pressure of the air introduced into the combustor;

monitoring a delta pressure across the pre-burner; and calculating a mass flow of air introduced into the combustor as a function of the temperature of the air introduced into the combustor, the pressure of the air introduced into the combustor, and the delta pressure across the pre-burner.

3. The method of claim 1, wherein said step of calculating a mass flow of air introduced into the combustor comprises the steps of:

monitoring a temperature of the air entering the catalyst module;

monitoring a total fuel flow to at least the first pre-burner; and calculating a mass flow of air introduced into the combustor as a function of the temperature of the air introduced into the combustor, the temperature of the air entering the catalyst module; and the total fuel flow to at least the first pre-burner.

4. The method of claim 1, wherein said step of calculating an inlet temperature set point for the catalyst module comprises the steps of:

calculating a temperature rise across the catalyst module based on the air mass flow and the fuel flow to be combusted; and calculating the inlet temperature set point based on the temperature rise across the catalyst.

5. The method of claim 4, wherein said step of calculating an inlet temperature set point for the catalyst module further comprises the steps of:

monitoring a temperature of the air entering the catalyst module to provide a closed loop feedback; and adjusting the temperature rise in response to the monitored temperature of the air entering the catalyst module.

6. The method of claim 1, wherein said step of monitoring a fuel flow to be combusted within the combustor comprises the step of monitoring a fuel flow demand signal controlling a main fuel metering valve.

7. The method of claim 1, wherein said step of controlling at least the first pre-burner to heat the air introduced into the combustor comprises the steps of:

generating at least a first pre-burner fuel demand signal to at least a first pre-burner fuel metering valve;

monitoring a temperature of the air entering the catalyst module to provide a closed loop feedback; and adjusting the first pre-burner fuel demand signal in response to the monitored temperature of the air entering the catalyst module.

8. The method of claim 1 wherein the combustor includes a second pre-burner, further comprising the step of generating a second fuel demand signal to control the second pre-burner based on the calculated air mass flow.

9. The method of claim 8, wherein said step of controlling at least the first pre-burner to heat the air introduced into the combustor comprises the steps of:

monitoring the second pre-burner fuel demand signal to the second pre- burner fuel metering valve; and adjusting the first pre-burner fuel demand signal in response to the monitored second fuel demand signal.

10. A method of controlling a catalytic combustion process within a combustor having at least a first pre-burner and at least one catalyst module therein, the combustor being supplied with air from a compressor, comprising the steps of:

estimating a mass flow of air introduced into the combustor;

monitoring a fuel flow to be combusted within the combustor;

monitoring a temperature of the air introduced into the combustor;

calculating an inlet temperature set point for the catalyst module based on the air mass flow and the fuel flow to be combusted; and controlling at least the first pre-burner to heat the air introduced into the combustor based on the inlet temperature set point, the air mass flow, and the temperature of the air introduced into the combustor.

11. The method of claim 10, wherein said step of estimating a mass flow of air introduced into the combustor comprises the steps of:

monitoring a speed of the compressor;

monitoring a temperature of ambient air; and estimating a mass flow of air introduced into the combustor as a function of the temperature of the ambient air, a given pressure of the ambient air, and the speed of the compressor.

12. The method of claim 10, wherein said step of calculating an inlet temperature set point for the catalyst module comprises the steps of:

calculating a temperature rise across the catalyst module based on the air mass flow and the fuel flow to be combusted; and calculating the inlet temperature set point based on the temperature rise across the catalyst.

13. The method of claim 12, wherein s aid step o f calculating an inlet temperature set point for the catalyst module further comprises the steps of:

monitoring a temperature of the air entering the catalyst module to provide a closed loop feedback; and adjusting the temperature rise in response to the monitored temperature of the air entering the catalyst module.

14. The method of claim 10, wherein said step of monitoring a fuel flow to be combusted within the combustor comprises the step of monitoring a fuel flow demand signal controlling a main fuel metering valve.

15. The met hod of claim 10, wherein said step of controlling at least the first pre-burner to heat the air introduced into the combustor comprises the steps of:

generating at least a first pre-burner fuel demand signal to at least a first pre-burner fuel metering valve;

monitoring a temperature of the air entering the catalyst module to provide a closed loop feedback; and adjusting the first pre-burner fuel demand signal in response to the monitored temperature of the air entering the catalyst module.

16. The method of claim 10 wherein the combustor includes a second pre-burner, further comprising the step of generating a second fuel demand signal to control the second pre-burner based on the calculated air mass flow.

17. The method of claim 16, wherein said step of controlling at least the first pre-burner to heat the air introduced into the comprises the steps of:

monitoring the second pre-burner fuel demand signal to the second pre-burner fuel metering valve; and adjusting the first pre-burner fuel demand signal in response to the monitored second fuel demand signal.

18. A catalytic combustion system for use in a dynamic plant, the plant supplying the catalytic combustion system with a flow of fuel and a supply of air to be mixed and combusted therein, the operation of the plant being controlled by a dynamic plant controller which generates a fuel flow rate demand signal to control the flow of fuel to be combusted in response to dynamic plant demands, the catalytic combustion system being capable of transparently replacing a conventional flame combustion system typically used with such a dynamic plant, comprising:

a catalytic combustor including at least a first pre-burner and at least one catalyst module therein;

at least a first fuel control valve;

a catalytic combustion controller; and an air inlet temperature sensor positioned to monitor a temperature of the air supplied to the system, said air inlet temperature sensor transmitting sensed inlet temperature information to said controller; and wherein said controller receives the fuel flow rate demand signal from the plant controller, calculates a mass flow of the air supplied by the plant, and calculates an inlet temperature set point for said catalytic combustor based on said air mass flow and the fuel flow to be combusted, said controller generating at least a first fuel demand signal based on said inlet temperature set point and said sensed inlet temperature;

wherein said first fuel control valve is responsive to said first fuel demand signal to supply fuel to said first pre-burner; and wherein said first pre-burner combusts said fuel to heat the air supplied by the plant.

19. A catalytic combustion system for use in a dynamic plant, the plant supplying the catalytic combustion system with a flow of fuel and a supply of air to be mixed and combusted therein, the operation of the plant being controlled by a dynamic plant controller which generates a fuel flow rate demand signal to control the flow of fuel to be combusted in response to dynamic plant demands, the catalytic combustion system being capable of transparently replacing a conventional flame combustion system typically used with such a dynamic plant, comprising:

a catalytic combustor including at least a first pre-burner and at least one catalyst module therein;

at least a first fuel control valve;

a catalytic combustion controller; and an air inlet temperature sensor positioned to monitor a temperature of the air supplied to the system, said air inlet temperature sensor transmitting sensed inlet temperature information to said controller; and wherein said controller receives the fuel flow rate demand signal from the plant controller, calculates a mass flow of the air supplied by the plant, and calculates an inlet temperature set point for said catalytic combustor based on said air mass flow and the fuel flow to be combusted, said controller generating at least a first fuel demand signal based on said inlet temperature set point and said sensed inlet temperature;

wherein said first fuel control valve is responsive to said first fuel demand signal to supply fuel to said first pre-burner; and wherein said first pre-burner combusts said fuel to heat the air supplied by the plant;

an air inlet pressure sensor positioned to monitor a pressure of the air supplied to the system, said air inlet pressure sensor transmitting sensed inlet pressure information to said controller; and a delta pressure sensor positioned to sense a delta pressure across the pre-burner, said delta pressure sensor transmitting sensed delta pressure information to said controller; and wherein said controller calculates said mass flow of the air supplied by the plant as a function of said sensed inlet temperature, said sensed inlet pressure, and said sensed delta pressure.

20. The system of claim 18, further comprising:

a post pre-burner temperature sensor positioned to monitor a temperature of air entering said catalyst module, said post pre-burn er temperature sensor transmitting sensed post pre-burner temperature information to said controller; and wherein said controller calculates said mass flow of air supplied by the plant as a function of said sensed inlet temperature , said sensed post pre- burner temperature, and said first fuel demand signal.

21. The system of claim 20, further comprising:

at least two post pre-burner temperature sensors positioned to monitor a temperature of air entering said catalyst module at different locations; and wherein said controller calculates a temperature uniformity difference between said sensed inlet temperatures provided by said at least two post pre-burner temperature sensors; and wherein said controller enunciates a temperature uniformity error condition when said temperature uniformity difference exceeds a first predetermined threshold.

22. The system of claim 21, wherein said controller initiates an emergency trip when said temperature uniformity difference exceeds a second predetermined threshold.

23. The system of claim 20, wherein said controller senses an auto-ignition condition as a function of said sensed inlet temperature, said controller transmitting auto-ignition condition information to said dynamic plant controller; and wherein said dynamic plant controller reduces a fuel flow to said catalyst module in response to said transmitted auto-ignition information.

24. The system of claim 23, wherein said controller initiates a safety shutdown when said controller continues to sense an auto-ignition condition for a period exceeding a predetermined time.

25. The system of claim 18, wherein said controller calculates a temperature rise across the catalyst module based on said air mass flow and the fuel flow to be combusted, said controller calculating said inlet temperature set point as a function thereof.

26. The system of claim 25, wherein said controller calculates a catalyst exit temperature from said monitored catalyst inlet temperature and said calculated temperature rise; and wherein said controller enunciates an over-temperature condition when said exit temperature exceeds a first predetermined temperature threshold.

27. The system of claim 26, wherein said controller initiates an emergency trip when said exit temperature exceeds a second predetermined temperature threshold.

28. The system of claim 25, further comprising:

a post pre-burner temperature sensor positioned to monitor a temperature of air entering said catalyst module, said post pre-burner temperature sensor transmitting sensed post pre-burner temperature information to said controller; and wherein said controller utilizes said sensed post pre-burner temperature to provide a closed loop feedback to adjust said temperature rise calculation.

29. The system of claim 18, further comprising:

a post pre-burner temperature sensor positioned to monitor a temperature o f air entering said catalyst module, said post pre-burner temperature sensor transmitting sensed post pre-burner temperature information to said controller; and wherein said controller utilizes said sensed post pre-burner temperature to provide a closed loop feedback to adjust said first pre-burner fuel demand signal.

30. The system of claim 18, further comprising a second pre-burner within said catalytic combustor, said controller generating a second fuel demand signal to control said second pre-burner as a function of said calculated air mass flow.

31. The system of claim 30, wherein said controller adjusts said first pre-burner fuel demand signal as a function of said second fuel demand signal.

32. A catalytic combustion system for use in a dynamic plant, the plant supplying the catalytic combustion system with a supply of air from a compressor and a flow of fuel to be mixed and combusted within the system, the operation of the plant being controlled by a dynamic plant controller which generates a fuel flow rate demand signal to control the flow of fuel to be combusted in response to dynamic plant demands, the catalytic combustion system being capable of transparently replacing a conventional flame combustion system typically used with such a dynamic plant, comprising:

a catalytic combustor including at least a first pre-burner and at least one catalyst module therein;

at least a first fuel control valve;

a catalytic combustion controller; and an ambient air temperature sensor positioned to monitor a temperature of the ambient air entering the compressor, said ambient air temperature sensor transmitting sensed ambient temperature information to said controller;

a compressor speed sensor positioned to monitor a speed of the compressor, said speed sensor transmitting sensed compressor speed information to said controller; and wherein said controller receives the fuel flow rate demand signal from the plant controller, estimates a mass flow of the air supplied by the compressor as a function of said sensed ambient temperature, said sensed speed of the compressor, and a known ambient pressure, said controller further calculating an inlet temperature set point for said catalytic combustor based on said air mass flow and the fuel flow to be combusted, said controller generating at least a first fuel demand signal based on said inlet temperature set point and said sensed inlet temperature;

wherein said first fuel control valve is responsive to said first fuel demand signal to supply fuel to said first pre-burner; and wherein said first pre-burner combusts said fuel to heat the air supplied by the plant.

33. A catalytic combustion system for use in a dynamic plant, the plant supplying the catalytic combustion system with a supply of air from a compressor and a flow of fuel to be mixed and combusted within the system, the operation of the plant being controlled by a dynamic plant controller which generates a fuel flow rate demand signal to control the flow of fuel to be combusted in response to dynamic plant demands, the catalytic combustion system being capable of transparently replacing a conventional flame combustion system typically used with such a dynamic plant, comprising:

- a catalytic combustor including at least a first pre-burner and at least one catalyst module therein;
- at least a first fuel control valve;
- a catalytic combustion controller; and
- an ambient air temperature sensor positioned to monitor a temperature of the ambient air entering the compressor, said ambient air temperature sensor transmitting sensed ambient temperature information to said controller;
- a compressor speed sensor positioned to monitor a speed of the compressor, said speed sensor transmitting sensed compressor speed information to said controller; and
- wherein said controller receives the fuel flow rate demand signal from the plant controller, estimates a mass flow of the air supplied by the compressor as a function of said sensed ambient temperature, said sensed speed of the compressor, and a known ambient pressure, said controller further calculating an inlet temperature set point for said catalytic combustor based on said air mass flow and the fuel flow to be combusted, said controller generating at least a first fuel demand signal based on said inlet temperature set point and said sensed inlet temperature:
- wherein said first fuel control valve is responsive to said first fuel demand signal to supply fuel to said first pre-burner;
- wherein said first pre-burner combusts said fuel to heat the air supplied by the plant;
- an air inlet pressure sensor positioned to monitor a pressure of the air supplied to the system, said air inlet pressure sensor transmitting sensed inlet pressure information to said controller;
- an air inlet temperature sensor positioned to monitor a temperature of the air supplied to the system, said air inlet temperature sensor transmitting sensed inlet temperature information to said controller; and
- a delta pressure sensor positioned to sense a delta pressure across the pre-burner, said delta pressure sensor transmitting sensed delta pressure information to said controller; and
- wherein said controller calculates said mass flow of the air supplied by the plant as a function of said sensed inlet temperature, said sensed inlet pressure, and said sensed delta pressure; and
- wherein said controller enunciates a degradation in compressor air flow when a ratio of said calculated mass flow to said estimated mass flow drops blow a predetermined minimum threshold.

34. The system of claim 32, further comprising:

- a post pre-burner temperature sensor positioned to monitor a temperature of air entering said catalyst module, said post pre-burner temperature sensor transmitting sensed post pre-burner temperature information to said controller;
- an air inlet temperature sensor positioned to monitor a temperature of the air supplied to the system, said air inlet temperature sensor transmitting sensed inlet temperature information to said controller; and
- wherein said controller calculates said mass flow of air supplied by the plant as a function of said sensed inlet temperature, said sensed post pre-burner temperature, and said first fuel demand signal; and
- wherein said controller enunciates a degradation in compressor air flow when a ratio of said calculated mass flow to said estimated mass flow drops blow a predetermined minimum threshold.

35. A method of controlling a catalytic combustion system for use in a gas turbine engine system, the gas turbine engine system including a compressor, a turbine, and a fuel supply subsystem, the compressor supplying a flow of air to the catalytic combustion system and the fuel supply subsystem supplying a flow of fuel to be combusted within the catalytic combustion system, the catalytic combustion system including at least one pre-burner and at least one catalyst module, the catalytic combustion system further including at least one temperature sensor positioned to sense temperature of air entering the catalyst module, comprising the steps of:

- purging the catalytic combustion system of combustible gases;
- ramping the turbine to an ignition speed;
- warming-up the catalyst module;
- ramping the turbine to desired speed;
- regulating a flow of fuel to be combusted within the catalytic combustion system to meet a power demand of the gas turbine engine.

36. The method of claim 35, wherein said step of purging the catalytic combustion system of combustible gases comprises the steps of:

- ramping the turbine to a first purge speed;
- maintaining the turbine at said first purge speed for a first predetermined period.

37. The method of claim 35, wherein the step of warming-up the catalyst module comprises the steps of:

- regulating a flow of fuel to the at least one pre-burner at a first level;
- monitoring the temperature of air entering the catalyst module;
- calculating a rate of change of temperature; and
- increasing the flow of fuel to the at least one pre-burner to a second level when the rate of change of temperature meets a predetermined level.

38. The method of claim 35, wherein the step of regulating a flow of fuel to be combusted within the catalytic combustion system to meet a power demand of the gas turbine engine comprises the steps of:

- calculating a mass flow of air introduced into the combustor;
- monitoring a fuel flow to be combusted within the combustor;
- monitoring a temperature of the air introduced into the combustor;
- calculating an inlet temperature set point for the catalyst module based on the air mass flow and the fuel flow to be combusted; and
- controlling the at least one pre-burner to heat the air introduced into the combustor based on the inlet temperature set point, the air mass flow, and the temperature of the air introduced into the combustor.

39. The method of claim 35, wherein the step of regulating a flow of fuel to be combusted within the catalytic combustion system to meet a power demand of the gas turbine engine comprises the steps of:

estimating a mass flow of air introduced into the combustor;

monitoring a fuel flow to be combusted within the combustor;

monitoring a temperature of the air introduced into the combustor;

calculating an inlet temperature set point for the catalyst module based on the air mass flow and the fuel flow to be combusted; and controlling at least the first pre-burner to heat the air introduced into the combustor based on the inlet temperature set point, the air mass flow, and the temperature of the air introduced into the combustor.

40. A dynamic plant, comprising:

a catalytic combustor having a compressed air inlet, at least one pre-burner, a fuel-air mixing portion, at least one catalyst module, a combustion burner zone, and a combusted gas outlet;

a compressor supplying compressed air to said compressed air inlet;

a fuel delivery system providing fuel to said at least one pre-burner and to said fuel-air mixing portion for combustion within said catalytic combustor;

a turbine in gaseous communication with said combusted gas outlet; and a dynamic controller monitoring parameters of the dynamic plant, said controller providing fuel control signals to the fuel delivery system to control a flow of fuel to said at least one pre-burner and said fuel-air mixing portion to meet dynamic plant performance, load, and emissions requirements over an entire range of operating conditions of the dynamic plan.

41. The dynamic plant of claim 40, wherein said controller calculates a primary fuel demand signal to control a speed of said turbine, and determines a mass flow of said compressed air delivered to said catalytic combustor, said controller calculating a secondary fuel demand signal based on said primary fuel signal and said mass flow to control the heating of said compressed air to maintain a temperature of combusted gas at said combusted gas outlet within a predetermined range, and wherein said fuel delivery system provides fuel to said at least one pre-burner in response and in proportion to said secondary fuel demand signal, and provides fuel to said gas-fuel mixing portion in response and in proportion to said primary fuel demand signal.

42. A dynamic plant, comprising:

a catalytic combustor having a compressed air inlet, at least one pre-burner, a fuel-air mixing portion, at least one catalyst module, a combustion burner zone, and a combusted gas outlet;

a compressor supplying compressed air to said compressed air inlet;

a fuel delivery system providing fuel to said at least one pre-burner and to said fuel-air mixing portion for combustion within said catalytic combustor;

a turbine in gaseous communication with said combusted gas outlet; and a dynamic controller monitoring parameters of the dynamic plant, said controller providing fuel control signals to the fuel delivery system to control a flow of fuel to said at least one pre-burner and said fuel-air mixing portion to meet dynamic plant performance, load, and emissions requirements over an entire range of operating conditions of the dynamic plan;

said controller calculates a primary fuel demand signal to control a speed of said turbine, and determines a mass flow of said compressed air delivered to said catalytic combustor, said controller calculating a secondary fuel demand signal based on said primary fuel signal and said mass flow to control the heating of said compressed air to maintain a temperature of combusted gas at said combusted gas outlet within a predetermined range, and wherein said fuel delivery system provides fuel to said at least one pre-burner in response and in proportion to said secondary fuel demand signal, and provides fuel to said gas-fuel mixing portion in response and in proportion to said primary fuel demand signal;

an air inlet temperature sensor positioned to monitor a temperature of said compressed air delivered to said catalytic combustor;

an air inlet pressure sensor positioned to monitor a pressure of said compressed air supplied to said compressed air inlet; and a delta pressure sensor positioned to sense a delta pressure across said at least one pre-burner; and wherein said controller determines said mass flow of said compressed air delivered to said catalytic combustor as a function of said sensed inlet temperature, said sensed inlet pressure, and said sensed delta pressure.

43. The dynamic plant of claim 41, further comprising:

an air inlet temperature sensor positioned to monitor a temperature of said compressed air delivered to said catalytic combustor;

a catalyst module air inlet temperature sensor positioned to monitor a temperature of air entering said catalyst module;

wherein said controller determines said mass flow of said compressed air delivered to said catalytic combustor as a function of said sensed inlet temperature, said sensed catalyst module air inlet temperature, and said primary fuel signal.

44. The dynamic plant of claim 41, further comprising:

an ambient air temperature sensor positioned to monitor a temperature of the ambient air entering the compressor;

a compressor speed sensor positioned to monitor a speed of said compressor; and wherein said controller determines said mass flow of said compressed air delivered to said catalytic combustor as a function of said sensed ambient temperature, said sensed speed of the compressor, and a known ambient pressure.

* * * * *